US008698794B2

(12) United States Patent
Takayama

(10) Patent No.: US 8,698,794 B2
(45) Date of Patent: Apr. 15, 2014

(54) COMPUTER-READABLE STORAGE MEDIUM HAVING OVERHEAD MAP RESOURCE GENERATION PROGRAM STORED THEREIN, COMPUTER-READABLE STORAGE MEDIUM HAVING OVERHEAD MAP DISPLAY PROGRAM STORED THEREIN, OVERHEAD MAP RESOURCE GENERATION APPARATUS, AND OVERHEAD MAP DISPLAY APPARATUS

(75) Inventor: Takahiro Takayama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 835 days.

(21) Appl. No.: 12/638,374

(22) Filed: Dec. 15, 2009

(65) Prior Publication Data

US 2011/0074769 A1    Mar. 31, 2011

(30) Foreign Application Priority Data

Sep. 28, 2009    (JP) .................................. 2009-223444

(51) Int. Cl.
*G06T 19/00*    (2011.01)

(52) U.S. Cl.
USPC ............ 345/419; 345/420; 345/423; 345/154; 345/156; 345/630

(58) Field of Classification Search
CPC .......... G06T 19/00; G06T 17/00; G06T 15/00
USPC ......... 345/419, 420, 421, 582, 154, 156, 630; 701/533; 711/207
See application file for complete search history.

(56) References Cited

U.S. PATENT DOCUMENTS

| | | | | |
|---|---|---|---|---|
| 6,292,830 | B1 * | 9/2001 | Taylor et al. | 709/224 |
| 2005/0128212 | A1 * | 6/2005 | Edecker et al. | 345/582 |
| 2007/0154167 | A1 * | 7/2007 | Ando et al. | 386/82 |
| 2008/0033641 | A1 * | 2/2008 | Medalia | 701/209 |
| 2009/0289937 | A1 * | 11/2009 | Flake et al. | 345/419 |
| 2009/0298498 | A1 * | 12/2009 | Pisut et al. | 455/434 |
| 2010/0201682 | A1 * | 8/2010 | Quan et al. | 345/419 |
| 2010/0223004 | A1 * | 9/2010 | Kondo | 701/201 |
| 2010/0284351 | A1 * | 11/2010 | Liang et al. | 370/329 |
| 2011/0261049 | A1 * | 10/2011 | Cardno et al. | 345/419 |
| 2012/0169734 | A1 * | 7/2012 | Snavely et al. | 345/419 |

FOREIGN PATENT DOCUMENTS

| | | |
|---|---|---|
| JP | 11-085012 | 3/1999 |
| JP | 2007-026129 | 2/2007 |

* cited by examiner

*Primary Examiner* — Kimbinh T Nguyen

(74) *Attorney, Agent, or Firm* — Nixon & Vanderhye, P.C.

(57) ABSTRACT

In a virtual three-dimensional space, an overhead image of a region in the virtual three-dimensional space is shot by a virtual camera provided in the virtual three-dimensional space. Next, it is determined whether or not the information about a color included in the shot overhead image satisfies a predetermined condition. Image data of the overhead image which it is determined in the result of the determination does not satisfy the predetermined condition is accumulated in a predetermined storage medium, thereby generating resource data. The above processing is repeated until all overhead images corresponding to a predetermined region in the virtual three-dimensional space are shot.

21 Claims, 19 Drawing Sheets

F I G. 9
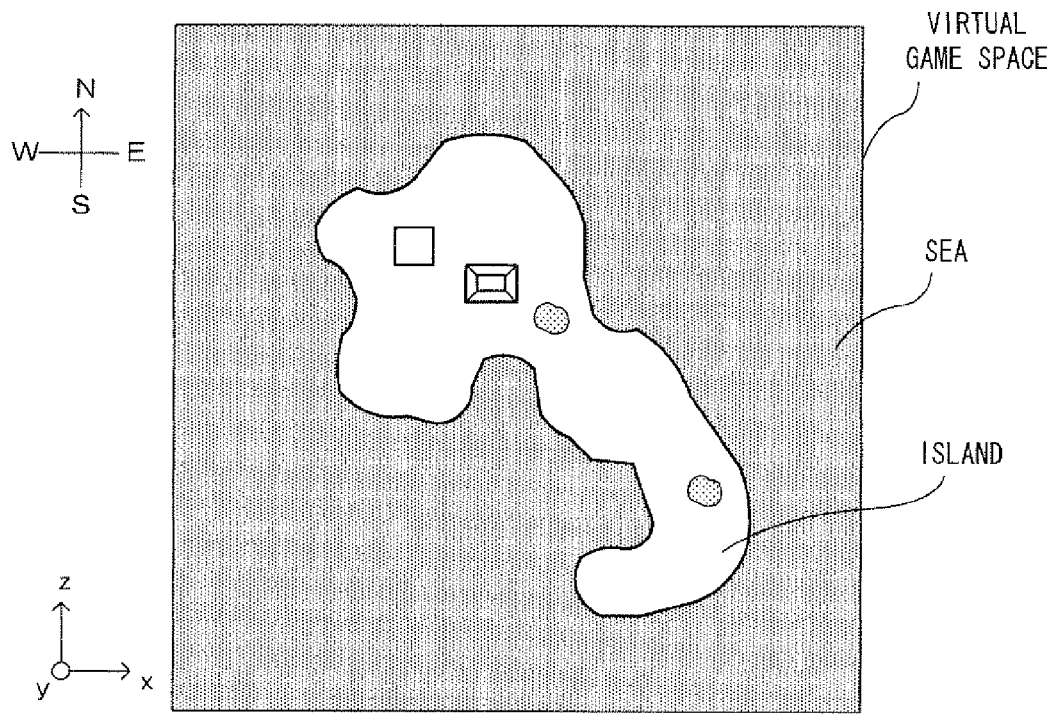
F I G. 1 0
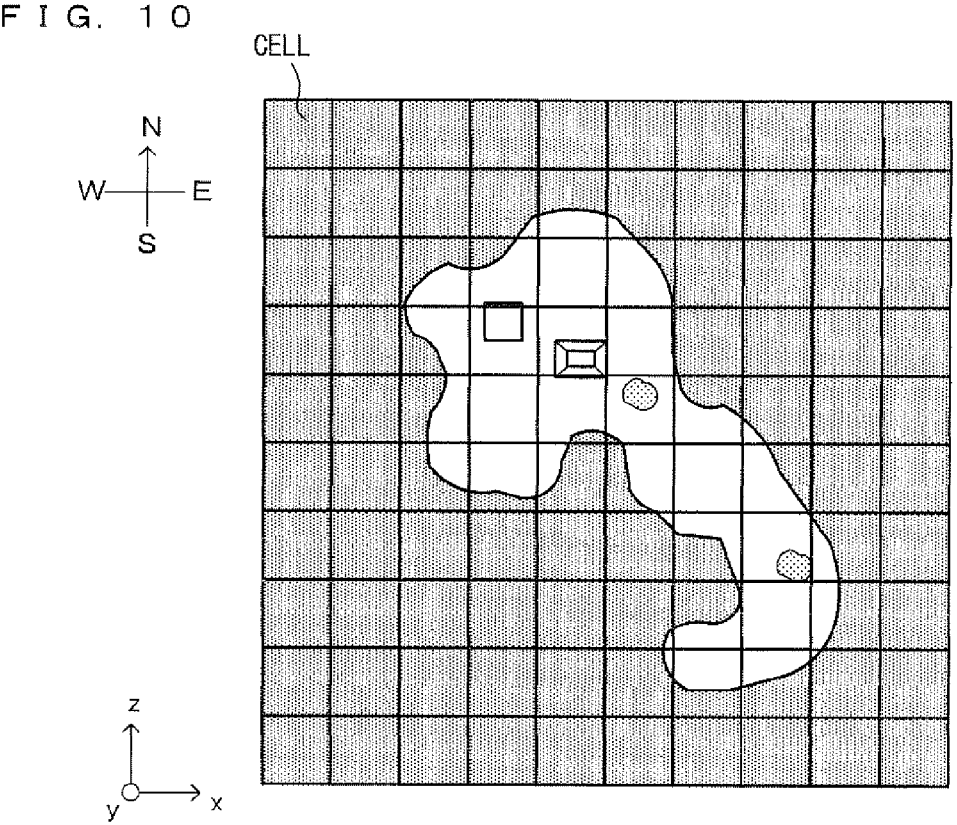

| CELL NUMBER | x-COORDINATE | z-COORDINATE | RESOURCE EXISTENCE FLAG |
|---|---|---|---|
| 1 | 32 | 32 | 0 |
| 2 | 96 | 32 | 0 |
| ⋮ | ⋮ | ⋮ | ⋮ |

WORK SCREEN IN
FRAME BUFFER

COMPUTER-READABLE STORAGE MEDIUM HAVING OVERHEAD MAP RESOURCE GENERATION PROGRAM STORED THEREIN, COMPUTER-READABLE STORAGE MEDIUM HAVING OVERHEAD MAP DISPLAY PROGRAM STORED THEREIN, OVERHEAD MAP RESOURCE GENERATION APPARATUS, AND OVERHEAD MAP DISPLAY APPARATUS

CROSS REFERENCE TO RELATED APPLICATION

The disclosure of Japanese Patent Application No. 2009-223444, filed on Sep. 28, 2009, is incorporated herein by reference.

BACKGROUND OF THE INVENTION

1. Field of the Invention

The present invention relates to a computer-readable storage medium having stored therein an overhead map resource generation program for generating a resource of an overhead map corresponding to a virtual three-dimensional space, an overhead map resource generation apparatus, a computer-readable storage medium having stored therein an overhead map display program for generating and displaying an overhead map by using the resource, and an overhead map display apparatus, and more particularly, to a computer-readable storage medium having stored therein an overhead map resource generation program for generating a resource of an overhead map based on image data obtained by shooting a virtual three-dimensional space from above and for executing processing for displaying the overhead map, an overhead map resource generation apparatus, a computer-readable storage medium having stored therein an overhead map display program, and an overhead map display apparatus.

2. Description of the Background Art

Conventionally, there has been known a technique for displaying a virtual three-dimensional space on a display apparatus, and at the same time, displaying a two-dimensional map which is a plain view of the virtual three-dimensional space looked upon from directly above (for example, Japanese Laid-Open Patent Publication No. 2007-26129). Such a two-dimensional map is created separately from data for displaying the virtual three-dimensional space and is saved in advance. Alternatively, such a two-dimensional map is created each time by using map data including position data of an object placed in the virtual three-dimensional space, and the like.

However, in an information processing apparatus disclosed in Japanese Laid-Open Patent Publication No. 2007-26129, in the case where the two-dimensional map is created separately from the data for displaying the virtual three-dimensional space, a work of creating (re-create) the two-dimensional map occurs each time a configuration of the virtual three-dimensional space is changed during development of a game, for example. Therefore, there is room for improvement, that is, it is desired that the work of creating the two-dimensional map is reduced. Moreover, in an information processing apparatus disclosed in Japanese Laid-Open Patent Publication No. 2007-26129, in the case where the two-dimensional map is created each time by using map data including position data of an object placed in the virtual three-dimensional space, and the like, since it is necessary to store the two-dimensional map corresponding to the whole of the virtual three-dimensional space, the amount of memory needed to store the two-dimensional map increases as the virtual three-dimensional space becomes larger. Therefore, there is room for improvement, that is, it is desired that consumption of memory for storing the two-dimensional map is reduced.

SUMMARY OF THE INVENTION

Therefore, an object of the present invention is to provide a resource generation program capable of reducing the burden on a developer, and of reducing a storage capacity needed to store an overhead map corresponding to a virtual three-dimensional space.

In addition, another object of the present invention is to provide a computer-readable storage medium having stored therein an overhead map display program capable of reducing the amount of processing.

The present invention has the following features to achieve the objects mentioned above. Note that reference numerals, supplementary explanations, and the like in the parentheses indicate an example of the correspondence relationship with an embodiment described below in order to aid in understanding the present invention and are not intended to limit, in any way, the scope of the present invention.

A first aspect is a computer-readable storage medium having stored therein an overhead map resource generation program which is executed by a computer of an overhead map resource generation apparatus for generating a resource for displaying an overhead map corresponding to a virtual three-dimensional space, the overhead map resource generation program causing the computer to function as shooting means, determination means, and resource data generation means. The shooting means shoots an overhead image of a region in the virtual three-dimensional space with a virtual camera provided in the virtual three-dimensional space. The determination means determines whether or not information about a color included in the overhead image shot by the shooting means satisfies a predetermined condition. The resource data generation means generates resource data by accumulating, in a predetermined storage medium, image data of the overhead image which the determination means determines does not satisfy the predetermined condition. Processing performed by the shooting means, the determination means, and the resource data generation means is repeated until all overhead images corresponding to a predetermined region in the virtual three-dimensional space are shot by the shooting means.

According to the first aspect, even if a configuration of the virtual three-dimensional space is changed during development, a burden of re-creating an overhead map corresponding to the virtual three-dimensional space on a developer can be decreased. The amount of data used as the resources of the overhead map can be reduced.

In a second aspect based on the first aspect, the overhead map resource generation program further causes the computer to function as virtual camera moving means for moving the virtual camera in the virtual three-dimensional space in accordance with a predetermined shooting condition. The shooting means shoots an overhead image of a region in the virtual three-dimensional space with the virtual camera moved by the virtual camera moving means.

According to the second aspect, the size of the overhead image can be set to any size.

In a third aspect based on the first aspect, the overhead map resource generation program further causes the computer to function as resource three-dimensional space generation means for drawing, among geographical objects included in the virtual three-dimensional space, a geographical object other than a predetermined kind of geographical object without drawing the predetermined kind of geographical object, and thereby generating a virtual three-dimensional space. The shooting means shoots the virtual three-dimensional space generated by the resource three-dimensional space generation means.

In a fourth aspect based on the third aspect, the resource three-dimensional space generation means generates the virtual three-dimensional space by using a predetermined single color for a background color and drawing a geographical object other than the predetermined kind of geographical object.

In a fifth aspect based on the third aspect, when all pixel values of the overhead image shot by the shooting means indicate an identical color, the determination means determines that the predetermined condition is satisfied.

In a sixth aspect based on the third aspect, when the overhead image includes a plurality of colors, the determination means determines that, among the plurality of colors, colors whose difference in tone is smaller than a predetermined degree are an identical color.

According to the third to sixth aspects, since an overhead image formed by a single color is excluded from targets to be made into resource, the amount of data used as the resources of the overhead map can be reduced.

In a seventh aspect based on the second aspect, the virtual camera moving means moves the virtual camera such that regions in the virtual three-dimensional space which are shot by the virtual camera do not overlap with each other.

According to the seventh aspect, extra shooting processing can be prevented from being performed, whereby the amount of processing can be reduced.

In an eighth aspect based on the seventh aspect, under the assumption that an image shot by looking down upon the virtual three-dimensional space from above so as to include the whole of the virtual three-dimensional space in one image is divided into squares having a predetermined size in a form of lattice, the virtual camera moving means moves the virtual camera on a square-by-square basis.

According to the eighth aspect, extra image data to be made into resources can be prevented from being generated.

In a ninth aspect based on the first aspect, the resource data generation means accumulates the image data together with information indicating a position in the virtual three-dimensional space corresponding to the overhead image shot by the shooting means, the information being attached to the image data.

According to the ninth aspect, since image data and a position in the virtual three-dimensional space corresponding to an overhead image are stored in a corresponding manner, load due to generation processing performed when generating the overhead map based the resource data can be reduced.

In a tenth aspect based on the first aspect, the shooting means shoots the overhead image of the virtual three-dimensional space by a method of orthogonal projection.

According to the tenth aspect, the overhead map for a user to easily view can be generated.

In an eleventh aspect based on the second aspect, the virtual camera moving means determines a distance by which the virtual camera moving means moves the virtual camera in accordance with an image size of the image data accumulated by the resource data generation means, and moves the virtual camera.

According to the eleventh aspect, image data having an appropriate size can be used in accordance with a content of the virtual three-dimensional space or a content of information processing performed with use of the content of the virtual three-dimensional space, and the amount of data used as the resources of the overhead map can be reduced.

A twelfth aspect is a computer-readable storage medium having stored therein an overhead map display program which is executed by a computer of an overhead map display apparatus for displaying an overhead map corresponding to a virtual three-dimensional space, the overhead map display program causing the computer to function as image data selection means, and overhead map display means. The computer is connected to resource data storage means which stores resource data which is obtained by accumulating, among image data obtained by repeatedly executing processing for shooting an overhead image of a region in the virtual three-dimensional space with a virtual camera which is moved in the virtual three-dimensional space in accordance with a predetermined shooting condition, only image data formed by an overhead image whose information about color does not satisfy a predetermined condition. The image data selection means selects predetermined image data from the resource data. The overhead map display means generates the overhead map based on the image data selected by the image data selection means, and displays the overhead map on a predetermined display apparatus.

According to the twelfth aspect, it becomes possible that drawing processing is executed only for a part needed as the overhead map, and the load due to processing for displaying the overhead map can be reduced.

A thirteenth aspect is a computer-readable storage medium having stored therein an overhead map display program which is executed by a computer of an overhead map display apparatus for displaying an overhead map corresponding to a virtual three-dimensional space, the overhead map display program causing the computer to function as position obtaining means, resource existence determination means, and overhead map display means. The computer is connected to resource data storage means which stores resource data which is obtained by accumulating, among image data obtained by repeatedly executing processing for shooting an overhead image of a region in the virtual three-dimensional space with a virtual camera which is moved in the virtual three-dimensional space in accordance with a predetermined shooting condition, only image data formed by an overhead image whose information about color does not satisfy a predetermined condition, together with information indicating a position, in the virtual three-dimensional space, corresponding to the shot overhead image.

The position obtaining means obtains a position, in the virtual three-dimensional space, corresponding to a predetermined display position in the overhead map. The resource existence determination means determines whether or not a piece of the image data corresponding to the position in the virtual three-dimensional space obtained by the position obtaining means is included in the resource data. The overhead map display means, if the resource existence determination means determines that the corresponding piece of the image data is included in the resource data, obtains the corresponding piece of the image data from the resource data and displays the corresponding image on the predetermined display position in the overhead map, and if the resource existence determination means determines that the corresponding piece of the image data is not included in the resource data, displays a predetermined image on the predetermined display position in the overhead map.

In a fourteenth aspect based on the thirteenth aspect, the overhead map display program further causes the computer to function as first overhead map out-of-range determination means for determining, based on a position of a player object and a predetermined drawing range, whether or not the position in the virtual three-dimensional space obtained by the position obtaining means is out of a range, in the virtual three-dimensional space, which is drawn as the overhead map. The resource existence determination means determines, only if the first overhead map out-of-range determination means determines that the position in the virtual three-dimensional space is not out of the overhead map, whether or not a piece of the image data corresponding to the position in the virtual three-dimensional space is included in the resource data.

In a fifteenth aspect based on the fourteenth aspect, the first overhead map out-of-range determination means determines, based on the position of the player object, the predetermined drawing range, and an enlargement factor of the overhead map, whether or not the position in the virtual three-dimensional space obtained by the position obtaining means is out of a range, in the virtual three-dimensional space, which is displayed as the overhead map.

In a sixth aspect based on the fourteenth aspect, the overhead map display program further causes the computer to function as second overhead map out-of-range determination means for determining, based on a direction of the player object, whether or not the position in the virtual three-dimensional space which the first overhead map out-of-range determination means determines is not out of the overhead map is included in the range, in virtual three-dimensional space, which is drawn as the overhead map. The resource existence determination means determines, only if the second overhead map out-of-range determination means determines that the position in the virtual three-dimensional space is not out of the overhead map, whether or not the piece of the image data corresponding to the position in the virtual three-dimensional space is included in the resource data.

According to the thirteenth to sixteenth aspects, load due to processing for drawing the overhead map can be reduced.

A seventeenth aspect is an overhead map resource generation apparatus for generating a resource for displaying an overhead map corresponding to a virtual three-dimensional space, the overhead map resource generation apparatus comprising shooting means, determination means, and resource data generation means. The shooting means shoots an overhead image of a region in the virtual three-dimensional space with a virtual camera provided in the virtual three-dimensional space. The determination means determines whether or not information about a color included in the overhead image shot by the shooting means satisfies a predetermined condition. The resource data generation means generates resource data by accumulating, in a predetermined storage medium, image data of the overhead image which the determination means determines does not satisfy the predetermined condition. Processing performed by the shooting means, the determination means, and the resource data generation means is repeated until all overhead images corresponding to a predetermined region in the virtual three-dimensional space are shot by the shooting means.

According to the seventeenth aspect, the same effect as that in the first aspect can be obtained.

An eighteenth aspect is an overhead map display apparatus for displaying an overhead map corresponding to a virtual three-dimensional space, the overhead map display apparatus comprising resource data storage means, image data selection means, and overhead map display means. The resource data storage means stores resource data which is obtained by accumulating, among image data obtained by repeatedly executing processing for shooting an overhead image of a region in the virtual three-dimensional space with a virtual camera which is moved in the virtual three-dimensional space in accordance with a predetermined shooting condition, only image data formed by an overhead image whose information about color does not satisfy a predetermined condition. The image data selection means selects predetermined image data from the resource data. The overhead map display means generates the overhead map based on the selected image data, and displays the overhead map on a predetermined display apparatus.

According to the eighteenth aspect, the same effect as that in the twelfth aspect can be obtained.

A nineteenth aspect is an overhead map display apparatus for displaying an overhead map corresponding to a virtual three-dimensional space, the overhead map display apparatus comprising resource data storage means, position obtaining means, resource existence determination means, and overhead map display means. The resource data storage means stores resource data which is obtained by accumulating, among image data obtained by repeatedly executing processing for shooting an overhead image of a region in the virtual three-dimensional space with a virtual camera which is moved in the virtual three-dimensional space in accordance with a predetermined shooting condition, only image data formed by an overhead image whose information about color does not satisfy a predetermined condition, together with information indicating a position, in the virtual three-dimensional space, corresponding to the shot overhead image. The position obtaining means obtains a position, in the virtual three-dimensional space, corresponding to a predetermined display position in the overhead map. The resource existence determination means determines whether or not a piece of the image data corresponding to the position in the virtual three-dimensional space obtained by the position obtaining means is included in the resource data. The overhead map display means, if the resource existence determination means determines that the corresponding piece of the image data is included in the resource data, obtains the corresponding piece of the image data from the resource data and displaying the corresponding image on the predetermined display position in the overhead map, and if the resource existence determination means determines that the corresponding piece of the image data is not included in the resource data, displays a predetermined image on the predetermined display position in the overhead map.

According to the nineteenth aspect, the same effect as that in the thirteenth aspect can be obtained.

A twentieth aspect is a method for generating a resource for displaying an overhead map and displaying the overhead map based on the resource, the method comprising a shooting step, a determination step, a resource data generation step, a control step, image data selection step, and overhead map display step. In the shooting step, an overhead image of a region in the virtual three-dimensional space is shot with a virtual camera provided in the virtual three-dimensional space. In the determination step, it is determined whether or not information about the overhead image shot in the shooting step satisfies a predetermined condition. In the resource data generation step, resource data is generated by accumulating, in a predetermined storage medium, image data of the overhead image which it is determined in the determination step does not satisfy the predetermined condition. In the control step, processing performed in the shooting step, the determination step, and the resource data generation step is repeated until all overhead images corresponding to a predetermined region in the virtual three-dimensional space are shot in the shooting step. In the image data selection step, predetermined image data is selected from the resource data. In the overhead map display step, the overhead map is generated based on the image data selected in the image data selection step, and the overhead map is displayed on a predetermined display apparatus.

According to the twentieth aspect, the amount of data used as the resources of the overhead map can be reduced, and further, load due to processing for drawing the overhead map can be reduced.

According to the present invention, a burden of creating the overhead map on a developer can be decreased. Moreover, the amount of data of resources used for generating the overhead map can be reduced.

Moreover, according to the present invention, load due to processing for displaying the overhead map can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 shows an example of a three-dimensional virtual game space;

FIG. 10 is a drawing for explaining an outline of resource generation processing;

DESCRIPTION OF THE PREFERRED EMBODIMENTS

The following will describe an embodiment of the present invention with reference to the drawings. It is noted that the present invention is not limited by the embodiment.

(Whole Configuration of Game System)

Figure 1:
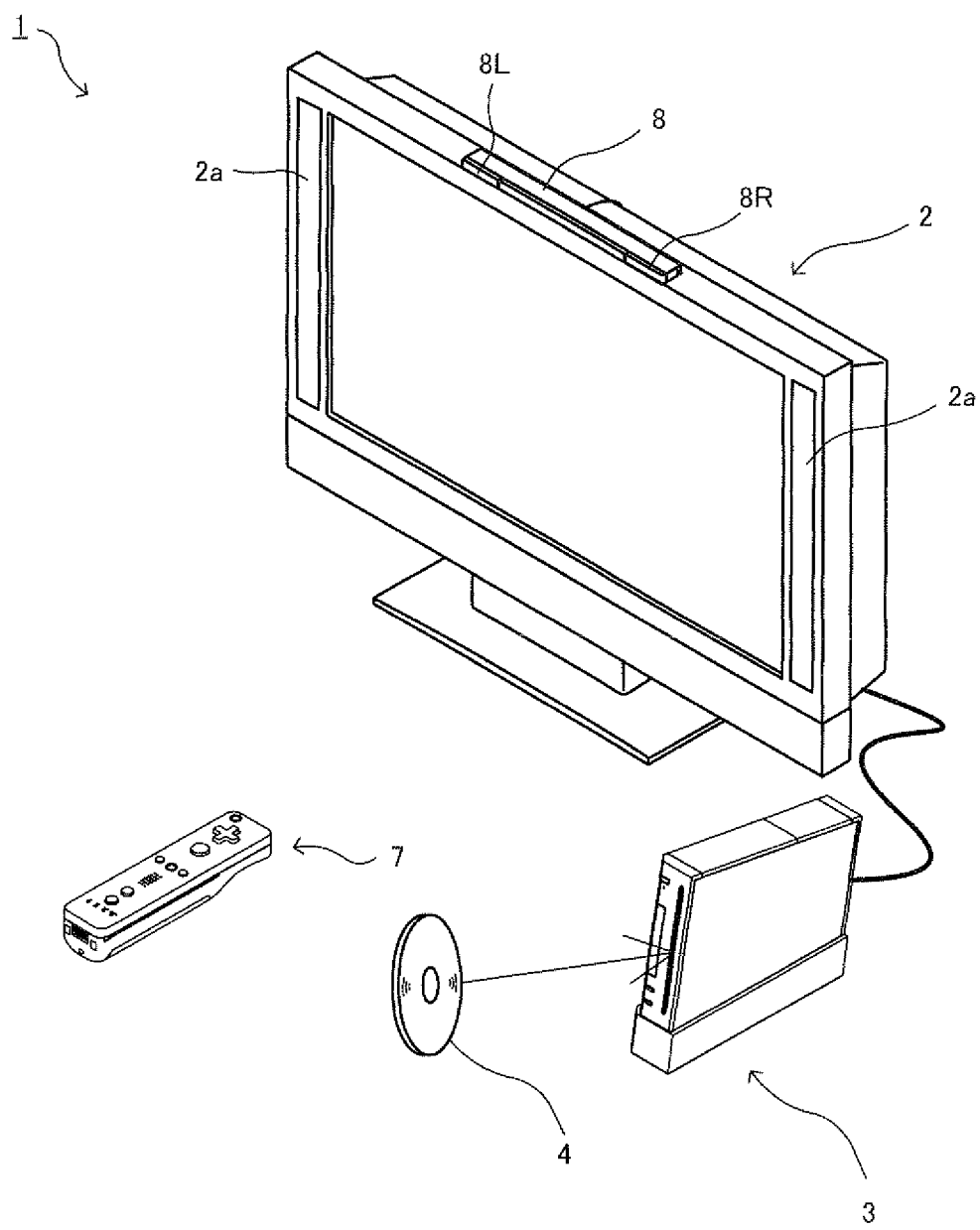
FIG. 1 is an external view for explaining a game system 1 according to an embodiment of the present invention.

Referring to FIG. 1, a game system 1 including a game apparatus according to the embodiment of the present invention. FIG. 1 is an external view of the game system 1. Hereinafter, the game apparatus and a game program of the present embodiment will be described using a stationary game apparatus as an example. As shown in FIG. 1, the game system 1 includes a television receiver (hereinafter, referred to merely as a television) 2, a game apparatus 3, an optical disc 4, a controller 7, and a marker section 8. The game system 1 executes game processing on the game apparatus 3 in accordance with a game operation using the controller 7.

The optical disc 4, which is an example of an exchangeable information storage medium replaceably used with respect to the game apparatus 3, is detachably inserted in the game apparatus 3. The optical disc 4 stores a game program which is to be executed by the game apparatus 3. The game apparatus 3 has an insertion slot for the optical disc 4 at its front surface. The game apparatus 3 reads and executes the game program stored in the optical disc 4 which is inserted in the insertion slot, thereby executing the game processing.

The television 2, which is an example of a display device, is connected to the game apparatus 3 via a connection cord. The television 2 displays game images which are obtained as the result of the game processing executed by the game apparatus 3. The marker section 8 is mounted adjacent to (on the upper surface of the screen in FIG. 1) the screen of the television 2. The marker section 8 has a marker 8R and a marker 8L at its opposite ends, respectively. The marker 8R has one or more infrared LEDs which output infrared lights forward from the television 2. The marker 8L has the same configuration as the marker 8R. The marker section 8 is connected to the game apparatus 3, and the game apparatus 3 is capable of controlling illumination of each infrared LED of the marker section 8.

The controller 7 is an input device which provides the game apparatus 3 with operation data which indicates contents of an operation made to the controller 7. The controller 7 is connected to the game apparatus 3 by wireless communication. In the present embodiment, the technology of, for example, Bluetooth (registered trademark) is used for the wireless communication between the controller 7 and the game apparatus 3. It is noted that in an alternative embodiment, the controller 7 may be connected to the game apparatus 3 via a wire.

(Internal Configuration of Game Apparatus 3)

Figure 2:
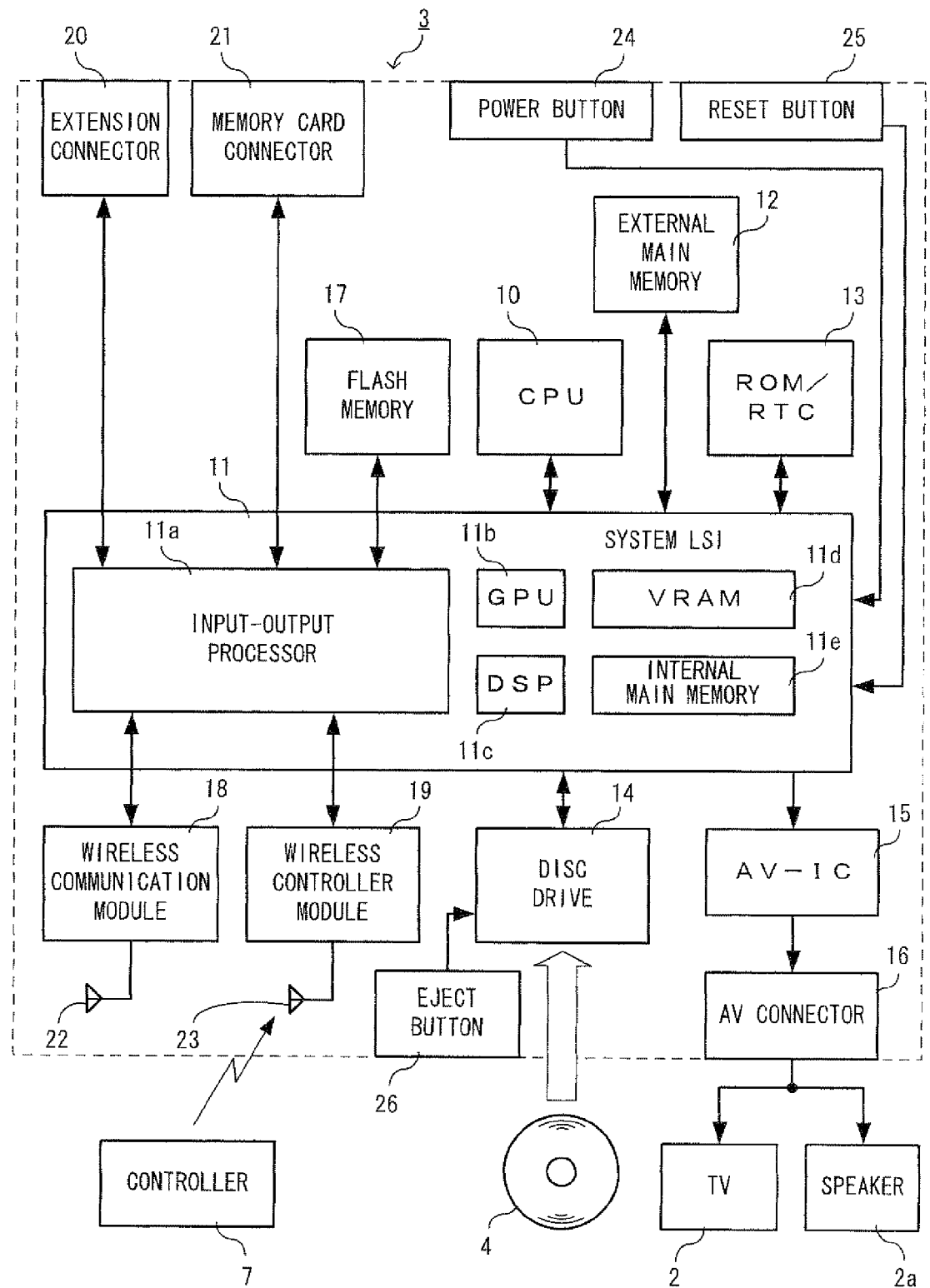
FIG. 2 is a function block diagram of a game apparatus 3 in FIG. 1.

The following will describe an internal configuration of the game apparatus 3 with reference to FIG. 2. FIG. 2 is a block diagram showing a configuration of the game apparatus 3. The game apparatus 3 includes a CPU 10, a system LSI 11, an external main memory 12, a ROM/RTC 13, a disc drive 14, an AV-IC 15, and the like.

The CPU 10 executes the game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as control of data transfer between the system LSI 11 and each component connected to the system LSI 11, generation of an image to be displayed, obtaining data from an external device, and the like. An internal configuration of the system LSI 11 will be described later. The volatile external main memory 12 stores a program such as the game program read from the optical disc 4, a game program read from a flash memory 17, and the like, and various data, and is used as a work area and a buffer area for the CPU 10. The ROM/RTC 13 includes a ROM (so-called boot ROM) which stores a program for starting up the game apparatus 3, and a clock circuit (RTC: Real Time Clock) for counting time. The disc drive 14 reads program data, texture data, and the like from the optical disc 4, and writes these data into an internal main memory 11e, which will be described below, or the external main memory 12.

The system LSI 11 is provided with an input-output processor 11a, a GPU (Graphics Processor Unit) 11b, a DSP (Digital Signal Processor) 11c, a VRAM 11d, and the internal main memory 11e. Although not shown in the drawings, these components 11a to 11e are connected to each other via an internal bus.

The CPU 11b forms a part of drawing means, and generates an image according to a graphics command (command for generating graphics) from the CPU 10. More specifically, the GPU 11b performs computing processing required for displaying 3D graphics, for example, performs processing of coordinate conversion from 3D coordinates into 2D coordinates which is performed prior to rendering, and finally, processing of rendering such as attaching texture, thereby generating game image data. In addition to the graphics command, the CPU 10 provides the CPU 11b with an image generation program required for generating the game image data. The VRAM 11d stores data, such as polygon data and texture data, which are required for the CPU 11b to execute the graphics command. In generating an image, the GPU 11d creates the image data using the data stored in the VRAM 11d.

The DSP 11c functions as an audio processor, and generates audio data using sound data and sound waveform (tone color) data which are stored in the internal main memory 11e and the external main memory 12. Like the external main memory 12, the internal main memory 11e stores a program and various data, and is used as a work area and a buffer area for the CPU 10.

The image data and the audio data generated thus are read by the AV-IC 15. The AV-IC 15 outputs the image data to the television 2 via an AV connector 16, and the audio data to speakers 2a built in the television 2. Thus, an image is displayed on the television 2, and sound is outputted from the speakers 2a.

The input-output processor (I/O processor) 11a performs transmission and reception of data to and from each component connected to the input-output processor 11a, and downloads data from an external device. The input-output processor 11a is connected to the flash memory 17, a wireless communication module 18, a wireless controller module 19, an extension connector 20, and a memory card connector 21. An antenna 22 is connected to the wireless communication module 18, and an antenna 23 to the wireless controller module 19.

The input-output processor 11a is connected to a network via the wireless communication module 18 and the antenna 22, so that the input-output processor 11a is communicable with another game apparatus connected to the network and various servers connected to the network. The input-output processor 11a periodically accesses the flash memory 17 to detect whether there are data required to be transmitted to the network. If there are such data, the input-output processor 11a transmits the data to the network via the wireless communication module 18 and the antenna 22. The input-output processor 11a receives data transmitted from the other game apparatus and data downloaded from a download server via the network, the antenna 22, and the wireless communication module 18, and stores the received data in the flash memory 17. The CPU 10 reads out the data stored in the flash memory 17 by executing the game program, and uses the data in the game program. In addition to the data transmitted or received between the game apparatus 3 and the other game apparatus or various servers, the flash memory 17 may store saved data (result data or midstream data of the game) of the game played using the game apparatus 3.

The input-output processor 11e receives operation data transmitted from the controller 7, via the antenna 23 and the wireless controller module 19, and stores (temporarily stores) the operation data in the buffer area of the internal main memory 11e or the external main memory 12.

In addition, the extension connector 20 and the memory card connector 21 are connected to the input-output processor 11e. The extension connector 20 is a connector for an interface such as USB and SCSI, and the communication with the network is enabled by connecting a medium such as an external storage medium, a peripheral device such as another controller, or a wired connector for communication to the extension connector 20 instead of the wireless communication module 18. The memory card connector 21 is a connector for connecting thereto an external storage medium such as a memory card. For example, the input-output processor 11a accesses the external storage medium via the extension connector 20 and the memory card connector 21, thereby saving data in the external storage medium and reading data from the external storage medium.

The game apparatus 3 is provided with a power button 24, a reset button 25, and an eject button 26. The power button 24 and the reset button 25 are connected to the system LSI 11. When the power button 24 is turned on, electric power is supplied to each component of the game apparatus 3 via an AC adaptor (not shown). In the state where the power has been turned on, if the power button 24 is pressed, the game apparatus 3 shifts to a low power standby mode. Even in the low power standby mode, electric power is supplied to the game apparatus 3. Because electric power is always supplied to the game apparatus 3, the game apparatus 3 can be always connected to a network such as the Internet even in this state. For turning off the power after the power is turned on, the power button 24 is pressed for a predetermined period of time or longer. The reset button 25 is pressed to cause the system LSI 11 to restart a boot program of the game apparatus 3. The eject button 26 is connected to the disc drive 14. The eject button 26 is pressed to eject the optical disc 4 from the disc drive 14.

Figure 3:
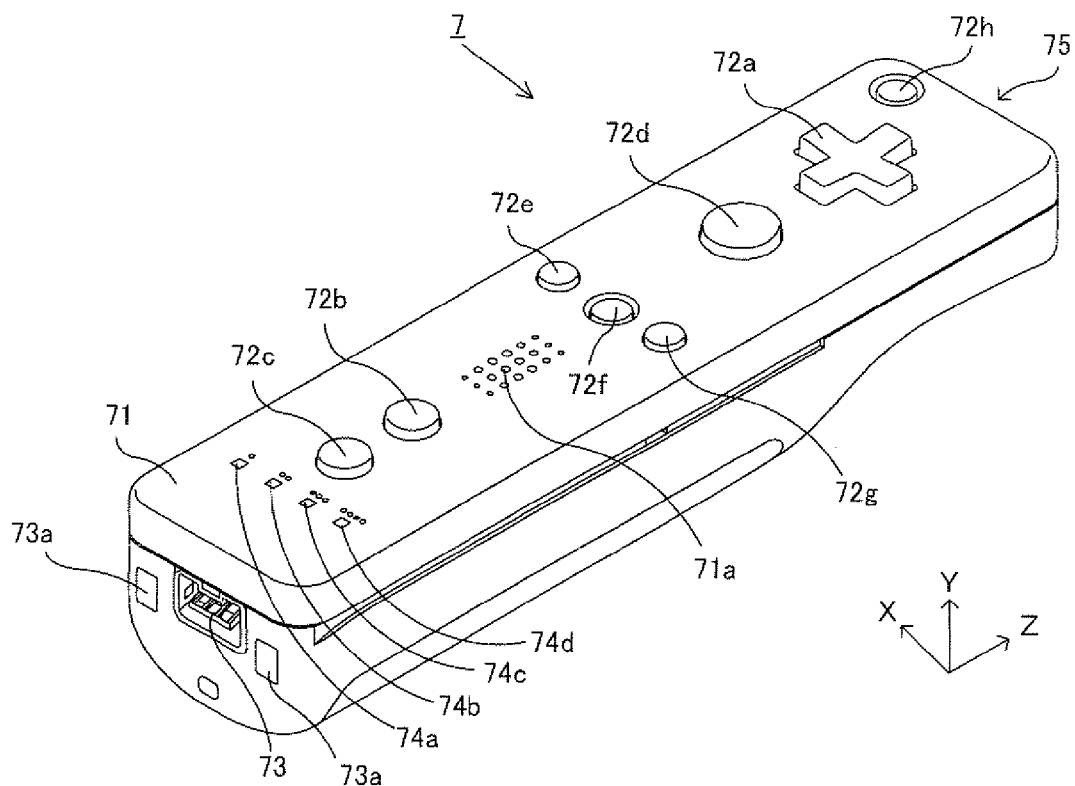
FIG. 3 is a perspective view of a controller 7 in FIG. 1 seen from a top rear side thereof.

Next, the controller 7 will be described with reference to FIGS. 3 and 4. FIG. 3 is a perspective view of the controller 7 seen from a top rear side thereof, and FIG. 4 is a perspective view of the controller 7 seen from a bottom front side thereof.

Figure 4:
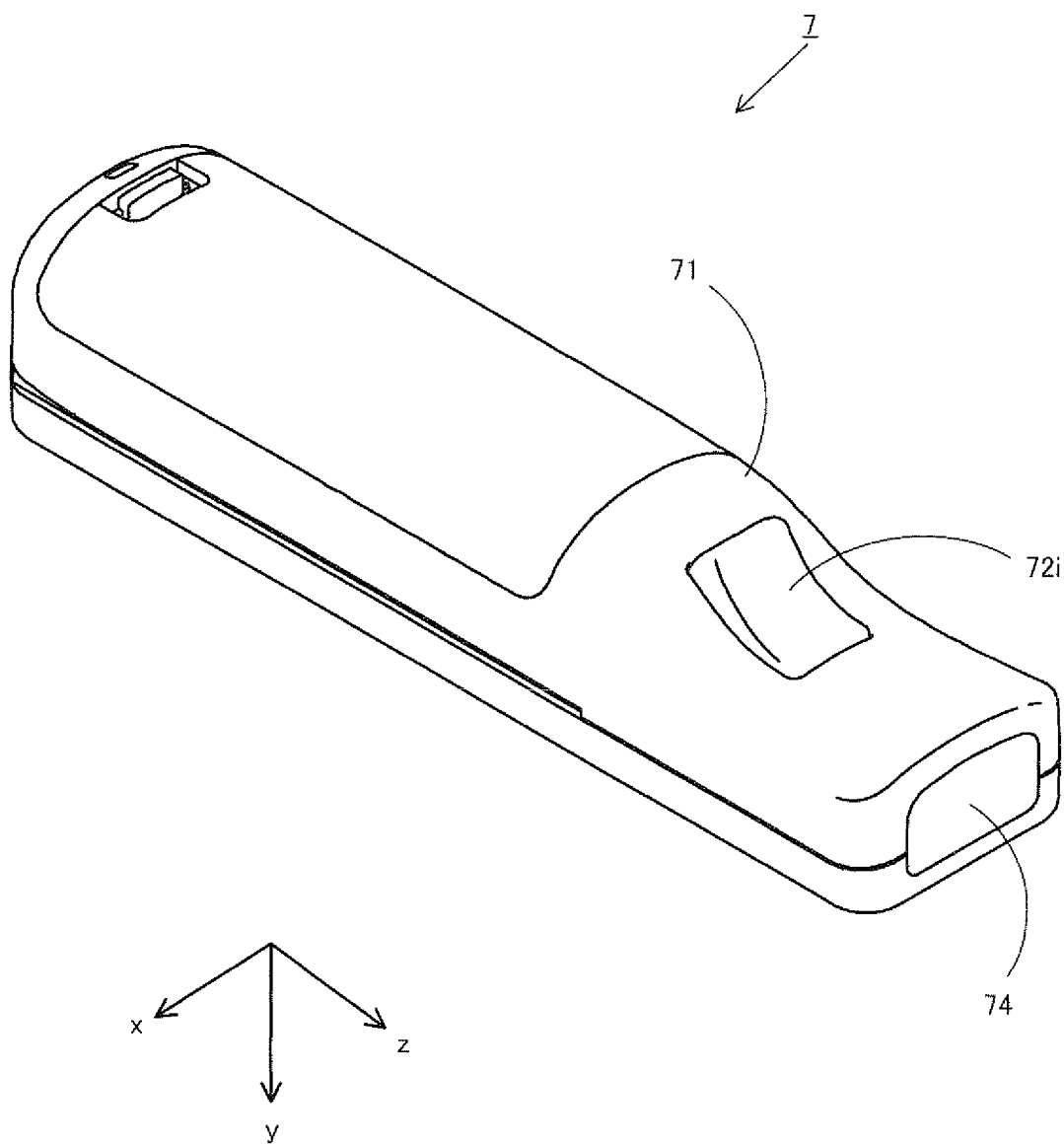
FIG. 4 is a perspective view of the controller 7 in FIG. 3 seen from a bottom front side thereof.

As shown in FIGS. 3 and 4, the controller 7 includes a housing 71 and an operation section 72 including a plurality of operation buttons which are provided on surfaces of the housing 71. The housing 71 of the present embodiment has a generally parallelepiped shape extending in a longitudinal direction from front to rear. The overall size of the housing 71 is small enough to be held by one hand of an adult or even a child, and, for example, the housing 71 is formed by plastic molding.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player object or the like appearing in a virtual game world is to move, or select an option from a plurality of options.

The cross key 72a is an operation section for outputting an operation signal in accordance with the above-described direction input operation performed by the player. Such an operation section may be provided in another form. For example, the cross key 72a may be replaced with an operation section which includes four push switches arranged in a square and which outputs an operation signal in accordance with the push button pressed by the player. In addition to the four push switches of the operation section, a center switch may be provided at the center of the four push switches to form a composite operation section including the four push switches and the center switch. Alternatively, the cross key 72a may be replaced with an operation section which includes an inclinable stick (or joystick) projecting from a top surface of the housing 71 and which outputs an operation signal in accordance with an inclining direction of the stick. Still alternatively, the cross key 72a may be replaced with an operation section which includes a disc-shaped and horizontally slidable member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are operation sections for, when the player presses a head thereof, outputting the corresponding operation signals. For example, functions as a number one button, a number two button and an A button are assigned to the operation buttons 72b to 72d, respectively. Also, functions as a minus button, a home button, and a plus button are assigned to the operation buttons 72e to 72g, respectively. Operation functions are assigned to the operation buttons 72b to 72g in accordance with the game program executed by the game apparatus 3. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (number) is assigned to the controller 7 such that the controller 7 is distinguishable from the other controllers 7. The LEDs 702 are used for, for example, informing the player of the controller type which is currently set for the controller 7. More specifically, when the controller 7 transmits transmission data to the game apparatus 3, one of the plurality of LEDs 702 which corresponds to the controller type of the controller 7 is lit up.

On the top surface of the housing 71, a plurality of holes are provided between the operation button 72b and the operation buttons 72e to 72g for emitting sound from a speaker (a speaker 706 in FIG. 5), which will be described later, to the outside therethrough.

On a bottom surface of the housing 71, a recessed portion is formed. As described later in detail, the recessed portion is formed in a position in which an index finger or middle finger of the player is located when the player holds the controller 7 with one hand such that the front surface thereof faces the makers 8L, and 8R. On a slope surface of the recessed portion, an operation button 72i is provided. The operation button 72i is an operation section functioning as, for example, a B button.

On a front surface of the housing 71, an image pickup element 743 constituting a part of an imaging information calculation section 74 is provided. The imaging information calculation section 74 is a system for analyzing image data of an image taken by the controller 7, thereby identifying an area having a high brightness in the image and detecting a position of a center of gravity, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

For giving a more specific description, a coordinate system set with respect to the controller 7 will be defined. As shown in FIGS. 3 and 4, mutually perpendicular x-axis, y-axis, and z-axis are defined with respect to the controller 7. More specifically, the longitudinal direction of the housing 71 or the front-rear direction of the controller 7 corresponds to z-axis, and the direction toward the front surface of the controller 7 (the surface in which the imaging information calculation section 74 is provided) is a positive direction of z-axis. The up-down direction of the controller 7 corresponds to y-axis, and the direction toward the top surface of the housing 71 (the surface on which the operation button 72a and the like are provided) is a positive direction of y-axis. The left-right direction of the controller 7 corresponds to x-axis, and the direction toward the right side surface of the housing 71 (the side surface which is not shown in FIG. 3 but shown in FIG. 4) is a positive direction of x-axis.

Figure 5:
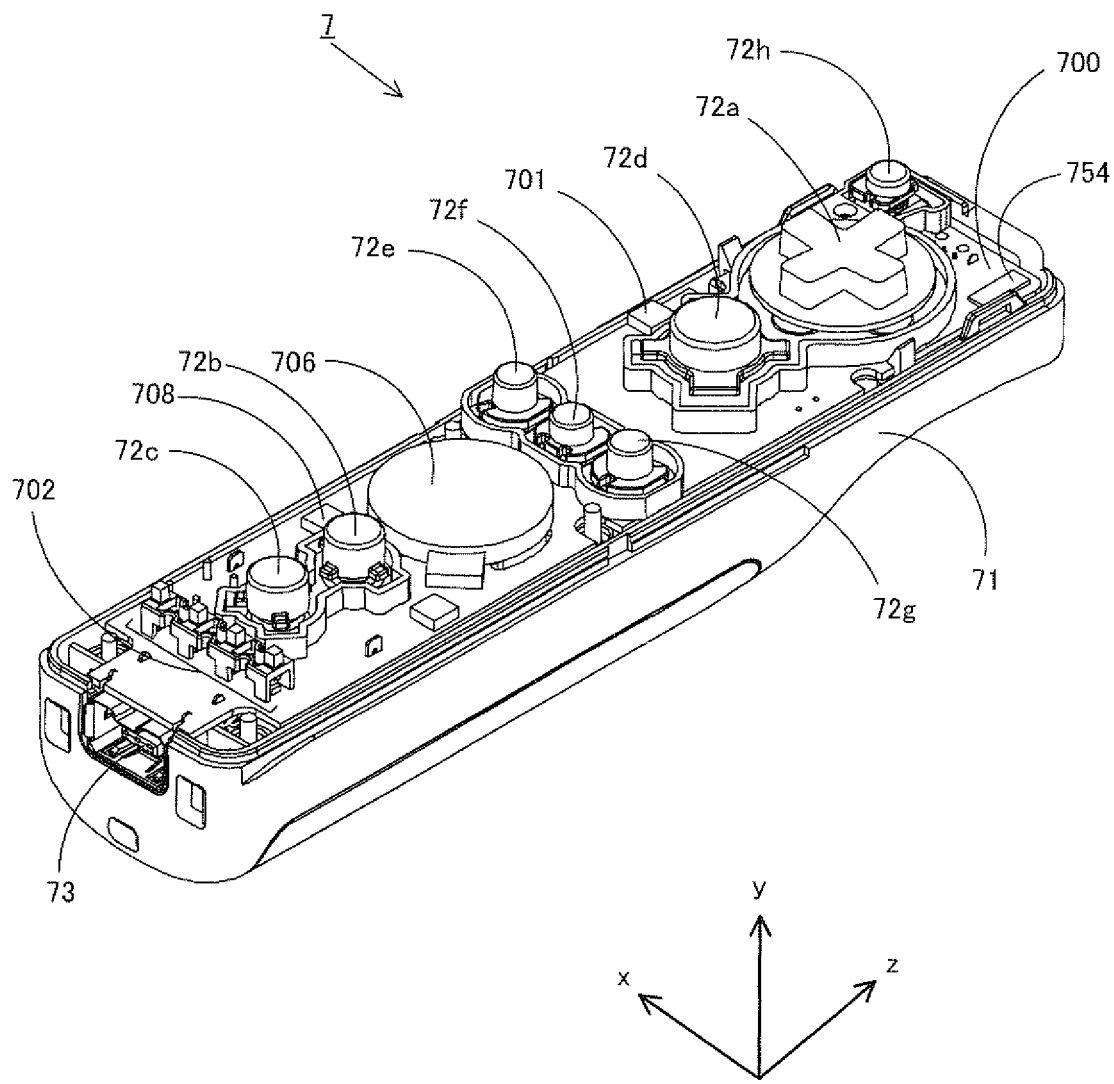
FIG. 5 is a perspective view showing the controller 7 in FIG. 3 in a state where an upper housing of the controller 7 is removed.
Figure 6:
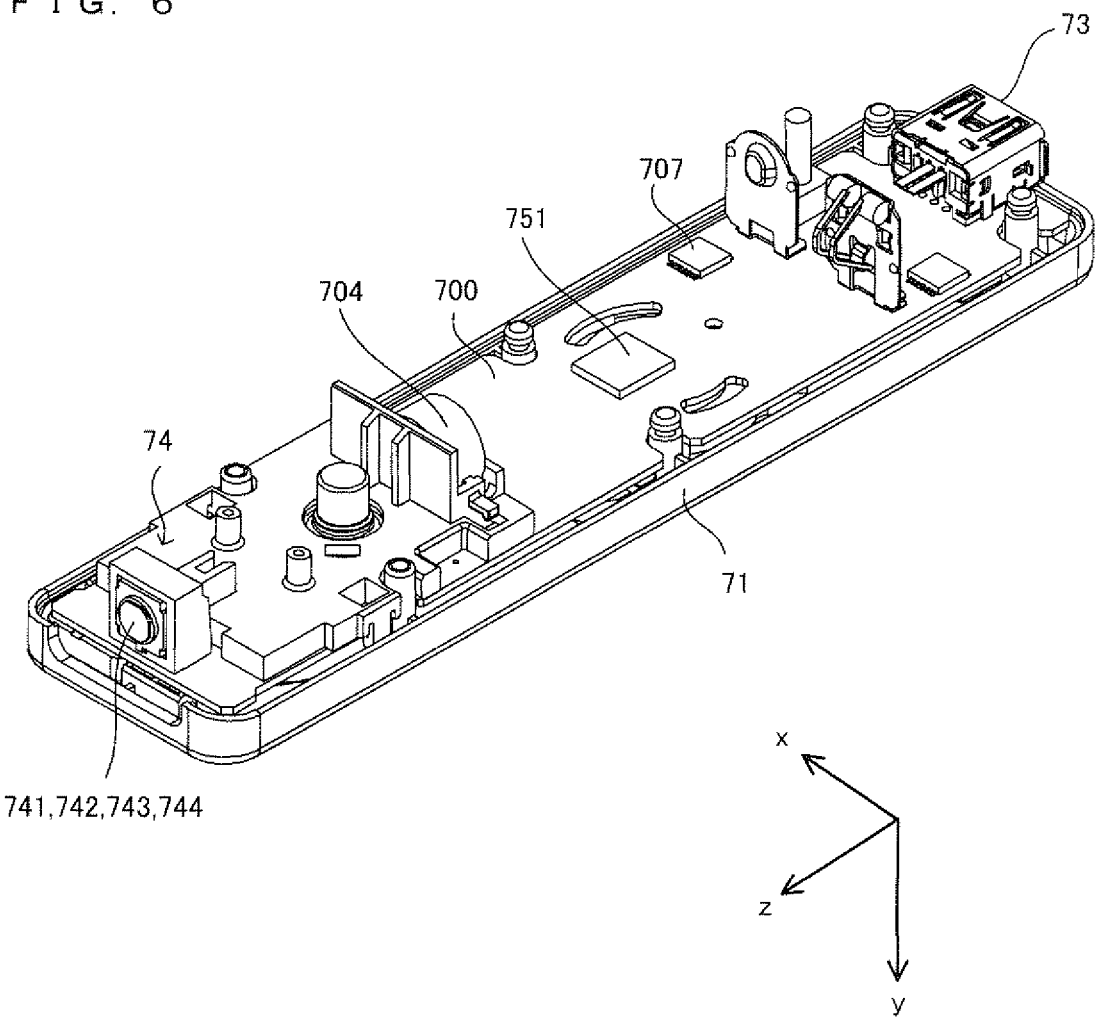
FIG. 6 is a perspective view showing the controller 7 in FIG. 3 in a state where a lower housing of the controller 7 is removed.

The following will describe an internal structure of the controller 7 with reference to FIGS. 5 and 6. FIG. 5 is a perspective view showing a state where an upper housing (a part of the housing 71) of the controller 7 is removed as seen from a rear side thereof. FIG. 6 is a perspective view showing a state where a lower housing (a part of the housing 71) of the controller 7 is removed as seen from a front side thereof. FIG. 6 shows a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, and an antenna 754 and the like are provided. These components are connected to a microcomputer 751 and the like (see FIGS. 6 and 7) by lines (not shown) formed on the substrate 700 and the like. The microcomputer 751 functions to generate operation data in accordance with a type of the operation button 72a and the like. This function is a known technique, and achieved, for example, by the microcomputer 751 detecting contact/non-contact of the line by a switch mechanism such as a tact switch located below a keytop. More specifically, for example, the operation button is pressed to contact with the line, thereby conducting a current therethrough. The microcomputer 751 detects which operation button the line in which the current conduction occurs leads to, and generates a signal in accordance with a type of the operation button.

The controller 7 functions as a wireless controller by a wireless module 753 (see FIG. 7) and the antenna 754. In the housing 71, a crystal oscillator (not shown) is provided for generating a basic clock of the microcomputer 751, which will be described later. On the top main surface of the substrate 700, the speaker 706 and an amplifier 708 are provided. The acceleration sensor 701 is provided on the left side of the operation button 72d on the substrate 700 (i.e. on the periphery of the substrate 700, not on the center thereof). The acceleration sensor 701 is capable of detecting acceleration included in a component caused by a centrifugal force in accordance with rotation of the controller 7 about the longitudinal direction thereof, in addition to change of direction of gravitational acceleration. Thus, the game apparatus 3 or the like can be sensitive enough to determine the rotation of the controller from detected acceleration data using a predetermined calculation.

As shown in FIG. 6, at a front edge of a bottom main surface of the substrate 700, the imaging information calculation section 74 is provided. The imaging information calculation section 74 includes an infrared filter 741, a lens 742, the image pickup element 743, and an image processing circuit 744 which are located in this order from the front surface of the controller 7. These components are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 via the amplifier 708 in accordance with the sound data transmitted from the game apparatus 3.

On the bottom main surface of the substrate 700, a vibrator 704 is attached. The vibrator 704 is, for example, a vibration motor or a solenoid. The vibrator 704 is connected to the microcomputer 751 by a line formed on the substrate 700 and the like, and actuated or unactuated in accordance with vibration data transmitted from the game apparatus 3. The controller 7 is vibrated by an actuation of the vibrator 704, and the vibration is conveyed to the player holding the controller V. Thus, a so-called vibration-feedback game is realized. Because the vibrator 704 is located in the front portion of the housing 71, the housing 71 is vibrated substantially, and hence the player holding the controller 7 easily feels the vibration.

Figure 7:
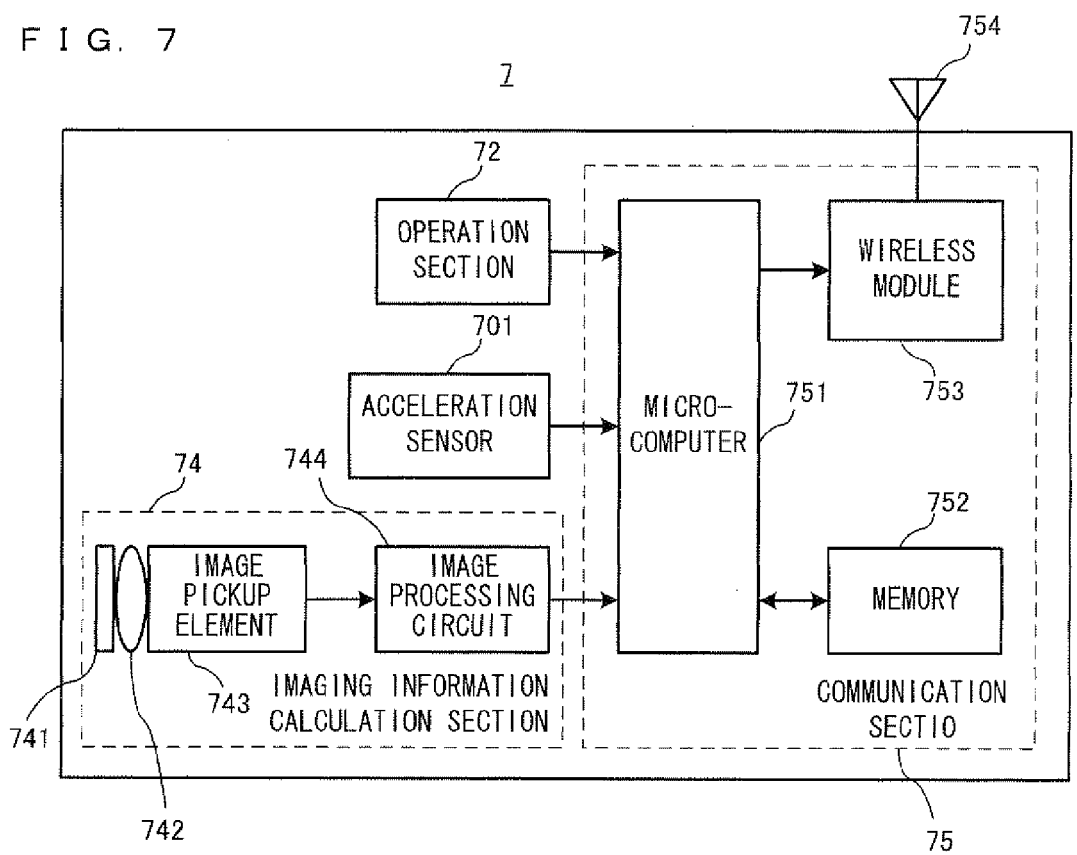
FIG. 7 is a block diagram showing a configuration of the controller 7 in FIG. 3.

The following will describe an internal constitution of the controller 7 with reference to FIG. 7. FIG. 7 is a block diagram showing an internal configuration of the controller 7.

As shown in FIG. 7, the controller 7 includes therein a communication section 75 in addition to the operation section 72, the imaging information calculation section 74, the acceleration sensor 701, the vibrator 704, the speaker 706, the sound IC 707, and the amplifier 708.

The imaging information calculation section 74 includes the infrared filter 741, the lens 742, the image pickup element 743, and the image processing circuit 744. The infrared filter 741 allows, among lights incident on the front surface of the controller 7, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a COD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. More specifically, the image processing circuit 744 processes the image data obtained from the image pickup element 743, detects an area of the image which has a high brightness, and outputs, to the communication section 75, process result data indicating the result of calculation of position coordinates and a square measure of the area. The imaging information calculation section 74 is fixed to the housing 71 of the controller 7. An imaging direction of the imaging information calculation section 74 can be changed by changing a facing direction of the housing 71. A signal in response to the position and the motion of the core unit 70 can be obtained based on the processing result data outputted from this imaging information calculation section 74.

The controller 7 preferably includes a three-axis (x-axis, y-axis, and z-axis) acceleration sensor 701. The three-axis acceleration sensor 701 detects linear acceleration in three directions, i.e., an up-down direction, a left-right direction, and a front-rear direction. In an alternative embodiment, a two-axis accelerometer which detects only linear acceleration along each of the up-down direction and the left-right direction (the other pair of directions) may be used depending on the type of control signals used in the game processing. As a non-limiting example, the two-axis or three-axis acceleration sensor 701 may be of the type available from Analog Devices, Inc. or STMicroelectronics N.V. Preferably, the acceleration sensor 701 may be of electrostatic capacitance or capacitance-coupling type which is based on silicon micromachined MEMS (microelectromechanical systems) technology. However, any other suitable accelerometer technology (e.g., piezoelectric type or piezoresistance type) now existing or later developed may be used to provide the two-axis or three-axis acceleration sensor 701.

As one skilled in the art understands, accelerometers, as used in the acceleration sensor 701, are only capable of detecting acceleration along a straight line (linear acceleration) corresponding to each axis of the acceleration sensor. In other words, the direct output of the acceleration sensor 701 is limited to signals indicative of linear acceleration (static or dynamic) along each of the one, two or three axes thereof. As a result, the acceleration sensor 701 cannot directly detect movement along a non-linear (e.g. arcuate) path, rotation, rotational movement, angular displacement, inclination, position, attitude or any other physical characteristic.

However, through processing by a computer such as the processor of the game apparatus (e.g. the CPU 10) or the processor of the controller 7 (e.g. the microcomputer 751) based on the acceleration signals outputted from the acceleration sensor 701, additional information relating to the controller 7 can be inferred or calculated, as one skilled in the art will readily understand from the description herein. For example, when the processing is performed by the computer on the assumption that the controller 7 provided with the acceleration sensor 701 is in static state (or when the processing is performed while only gravitational acceleration is detected by the acceleration sensor 701), if the controller 7 is actually in static state, the detected acceleration is used to determine whether or not the controller 7 is inclined relative to the direction of gravity or how many degrees the controller 7 is inclined relative to the direction of gravity. More specifically, when a state where the detection axis of the acceleration sensor 701 extends in a vertically-down direction is set as a standard state, it is possible to determine whether or not the controller 7 is inclined by determining whether 1G (gravitational acceleration) is applied in the direction of the detection axis of the acceleration sensor 701. It is also possible to determine how many degrees the controller 7 is inclined with respect to the vertically downward direction by determining the magnitude of the acceleration applied in the above detection axis direction. In addition, in the case of a multi-axis acceleration sensor, it is possible to determine in detail how many degrees each axis is inclined relative to the direction of gravity through processing of a signal of acceleration detected for each axis. In this case, a processor may perform processing based on the output from the acceleration sensor 701 for calculating inclination angle data of the controller 7. Alternatively, processing may be performed so as to infer rough inclination of the controller 7 based on the output from the acceleration sensor 701 without calculating the inclination angle data. As described above, the acceleration sensor 701 is used in combination with the processor to determine inclination, attitude, or position of the controller 7. On the other hand, on the assumption that the acceleration sensor 701 is in dynamic state, the acceleration sensor 701 detects acceleration corresponding to motion of the acceleration sensor 701 in addition to a gravitational acceleration component. Thus, it is possible to determine the direction of the motion of the controller 7 by eliminating the gravitational acceleration component through predetermined processing. More specifically, various movements and/or positions of the controller 7 can be calculated or inferred through processing of the acceleration signal generated by the acceleration sensor 701 when the controller 7 provided with the acceleration sensor 701 is subjected to dynamic acceleration by the hand of the user. It is noted that even on the assumption that the acceleration sensor 701 is in dynamic state, it is possible to determine inclination of the controller 7 relative to the direction of gravity by eliminating acceleration corresponding to motion of the acceleration sensor 701 through predetermined processing. In an alternative embodiment, the acceleration sensor 701 may include an embedded signal processor or other type of a dedicated processor for performing any desired processing of the acceleration signals outputted from accelerometers therein prior to outputting signals to the microcomputer 751. For example, the embedded or dedicated processor could convert the detected acceleration signal into the corresponding tilt angle (or another suitable parameter) when the acceleration sensor 701 is intended to detect static acceleration (e.g., gravitational acceleration).

In an alternative embodiment, a gyro-sensor incorporating, for example, a rotating or vibrating element may be used as a sensor for detecting motion of the controller 7. Exemplary MEMS gyro-sensors which may be used in this embodiment are available from Analog Devices, Inc. Unlike the acceleration sensor 701, a gyro-sensor is capable of directly detecting rotation (or angular velocity) around an axis defined by the gyroscopic element (or elements) therein. Thus, due to the fundamental differences between a gyro-sensor and a acceleration sensor, corresponding changes need to be made to the processing operations which are performed on the output signals from these devices depending on which device is selected for a particular application.

Specifically, when a gyro-sensor is used instead of an acceleration sensor to calculate inclination and attitude, significant changes are necessary. More specifically, when a gyro-sensor is used, the value of inclination is initialized at the start of detection. Then, data on angular velocity which is outputted from the gyro-sensor is integrated. Furthermore, a change amount in inclination from the value of tilt previously initialized is calculated. In this case, the calculated inclination is determined as a value corresponding to an angle. In contrast, when an acceleration sensor is used, inclination is calculated by comparing the value of the gravitational acceleration of each axial component with a predetermined reference. Therefore, the calculated inclination can be represented as a vector. Thus, without initialization, an absolute direction can be determined with an accelerometer. The type of the value calculated as an inclination is also very different between a gyro-sensor and an accelerometer; i.e., the value is an angle when a gyro-sensor is used and is a vector when an accelerometer is used. Therefore, when a gyro-sensor is used instead of an acceleration sensor, data on inclination also needs to be processed by a predetermined conversion that takes into account the fundamental differences between these two devices. Due to the fact that the nature of gyro-sensors is known to one skilled in the art, as well as the fundamental differences between accelerometers and gyro-sensors, further details are not provided herein. While gyro-sensors provide certain advantages due to their ability to directly detecting rotation, acceleration sensors are generally more cost-effective as compared with the gyro-sensors when used for the controller of the present embodiment.

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the sound IC 707 and the vibrator 704 in accordance with the data which the wireless module 753 receives from the game apparatus 3 via the antenna 754. The sound IC 707 processes the sound data and the like transmitted from the game apparatus 3 via the communication section 75. The microcomputer 751 actuates the vibrator 704 in accordance with the vibration data (e.g. a signal for actuating or unactuating the vibrator 704) transmitted from the game apparatus 3 via the communication section 75.

Data from the controller 7 including an operation signal (key data) from the operation section 72, acceleration signals (acceleration data of directions of x-axis, y-axis, and z-axis which is hereinafter referred to merely as acceleration data) from the acceleration sensor 701, and the processing result data from the imaging information calculation section 74, are outputted to the microcomputer 751. The microcomputer 751 temporarily stores the input data (the key data, the acceleration data, and the processing result data) in the memory 752 as the transmission data which is to be transmitted to the wireless controller module 19. The wireless transmission from the communication section 75 to the wireless controller module 19 is performed periodically at a predetermined time interval. Because game processing is generally performed at a cycle of 1/60 sec., data needs to be transmitted at a cycle of a shorter time period. Specifically, the game processing unit is 16.7 ms (1/60 sec.), and the transmission interval of the communication section 75 structured using the Bluetooth (registered trademark) technology is 5 ms. At the transmission timing to the wireless controller module 19, the microcomputer 751 outputs the transmission data stored in the memory 752 as a series of operation information to the wireless module 753. The wireless module 753 uses, for example, the Bluetooth (registered trademark) technology to modulate the operation data onto a carrier wave of a predetermined frequency and to radiate the resultant radio signal from the antenna 754. Thus, the key data from the operation section 72 provided in the controller 7, the acceleration data from the acceleration sensor 701, and the processing result data from the imaging information calculation section 74 are modulated into the radio signal by the wireless module 753 and transmitted from the controller 7. The wireless controller module 19 of the game apparatus 3 receives the radio signal, and the game apparatus 3 demodulates or decodes the radio signal to obtain the series of operation information (the key data, the acceleration data, and the processing result data). Based on the obtained operation information and the game program, the CPU 10 of the game apparatus 3 performs the game processing. In the case where the communication section 75 is structured using the Bluetooth (registered trademark) technology, the communication section 75 can have a function of receiving transmission data which is wirelessly transmitted from another device.

Figure 8:
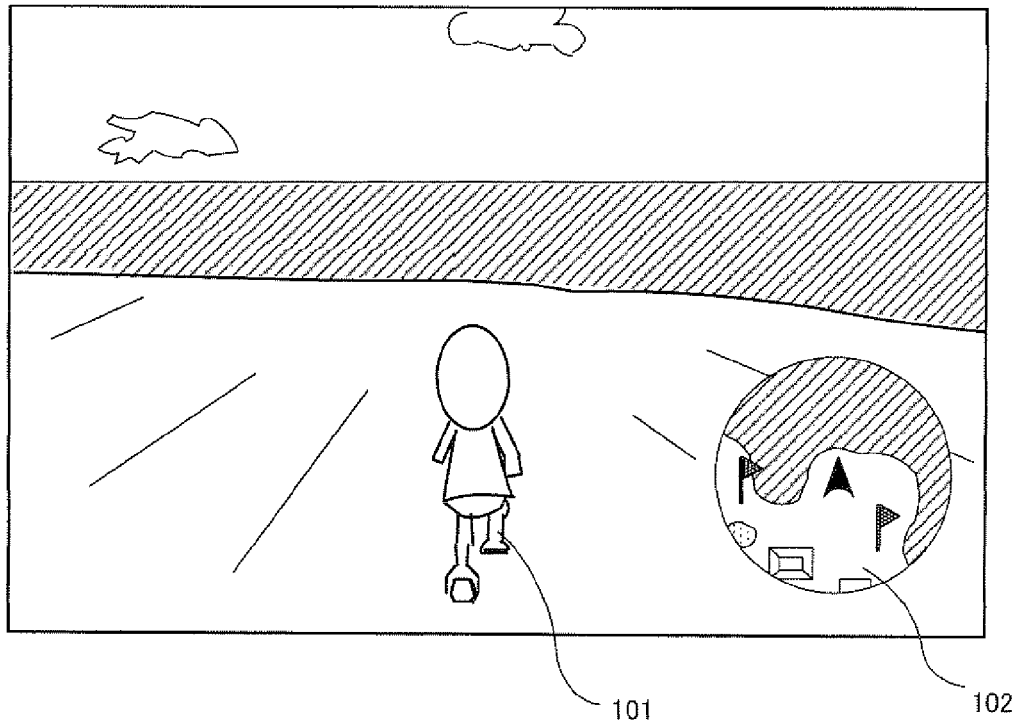
FIG. 8 shows an example of a screen of a game assumed in the present embodiment.

Next, outlines of a game assumed in the present embodiment and processing according to the present embodiment will be described. FIG. 8 shows an example of a screen of the game assumed in the present embodiment. In the game assumed in the present embodiment, as shown in FIG. 9, an island is formed in a three-dimensional virtual game space (hereinafter, simply referred to as a virtual game space), and a player object can freely move in the island. As a basic game screen, a view obtained by shooting a virtual game space with a virtual camera positioned behind a player object 101 is displayed as shown in FIG. 8. In addition, a circular region 102 is displayed at the lower right of the screen. In the region 102, a map the virtual game space looked down upon from directly above is displayed. Hereinafter, in the present embodiment, this map is referred to as an overhead map (note that, in some games, this map can also be referred to as "reduced map", "radar screen", "two-dimensional map", or the like). The player can easily check a surrounding situation such as a geographical object around the player object 101, by referring to the overhead map. The present invention relates to generation and display of the overhead map.

Processing for the overhead map described in the present embodiment is largely divided into two stages of processes. A first process is a process for generation of a resource which is a base for the overhead map, and in the present embodiment, the first process is executed at a stage of development of a game. In the generation of the resource, the virtual game space in which various geographical objects forming the island are arranged is shot from above with the virtual camera (as the virtual camera looking down upon the virtual game space), and data of the shot image is used as a resource of the overhead map. A second process is a process for generating the overhead map with use of the generated resource and displaying the overhead map on the game screen. This process is executed as a part of game processing performed when the player plays the game (that is, executed at a stage after completion of the product, i.e., at a stage of execution of game processing).

Next, outlines of the above two processes will be described. Firstly, the outline of resource generation processing of the overhead map will be described. As shown in FIG. 9, an overhead image obtained by shooting the virtual game space from directly above with the virtual camera is conceptually assumed. Moreover, as shown in FIG. 10, images obtained by dividing the overhead image into predetermined-size squares (which are, for example, squares of 64×64 or 128×128 pixels, and hereinafter, referred to as cells) are assumed (in other words, the cells are conceptually understood as areas obtained by looking down upon the virtual game space from above and dividing the same into units of a predetermined size). Data of images in the cells is saved as the resources for the overhead map, except images formed by a predetermined single color (for example, in the case where an object of a sea is formed by a single color, an image in a cell positioned at the sea surface is formed by only a single color. Note that although pictures of the island are drawn in a simplified manner in FIG. 9 and FIG. 10, actually, various buildings, trees, roads or the like are provided). For example, processing is performed such that an image in a cell positioned at the sea surface is not saved as the resource, and only an image in a cell where there is a geographical object other than the sea surface is made into the resource and saved. In the present embodiment, an image for one cell is saved as an image file to which one file name is assigned (that is, an image of one cell=one file). In the following description, each file is referred to as "capture data", and the entire pieces of capture data are collectively referred to as "resource data".

The resource data is stored, as a part of data of a game which is to be a product, in a predetermined optical disk or the like, together with a game program and the like. Thus, it is not necessary to save image data of the whole of the virtual game space as the resource, and, for example, referring to FIG. 10, it becomes possible that only image data of the island is used as the resources while excluding most of the sea, whereby the amount of data used as the resources for the overhead map can be reduced.

Next, the outline of processing for generation and display of the overhead map which is executed at a stage of execution of the game will be described. In the processing for generation and display of the overhead map, the resource data generated in the above-described resource generation processing is used to generate the overhead map, wherein the processing is performed such that only minimal amount of capture data which is needed is read out. Specifically, first, a range to be displayed as the overhead map is determined, using a position of the player object in the virtual game space as a reference. Next, cells corresponding to the overhead map range are extracted (the size of these cells is the same as that used at the stage of development). That is, in the processing, cells positioned far from the player object are not extracted. Next, plate-shaped polygons are disposed at positions, in the overhead map range, which correspond to the extracted cells, and capture data to be used for images drawn on the polygons, i.e., capture data corresponding to the positions of the extracted cells is retrieved. Here, in the above-described resource generation processing, capture data is not generated for the cells positioned at the sea surface. Therefore, if the extracted cells are positioned at the sea surface, there is no corresponding capture data. Accordingly, in the present embodiment, the processing is performed such that, if there is a piece of capture data corresponding to the extracted cells, images indicated by the corresponding capture data are drawn on the plate-shaped polygon, and if there is no capture data corresponding to the extracted cells, drawing is performed on the polygons by using a predetermined color, i.e., a color of water surface in the present embodiment (the polygons are painted in that color).

Figure 11:
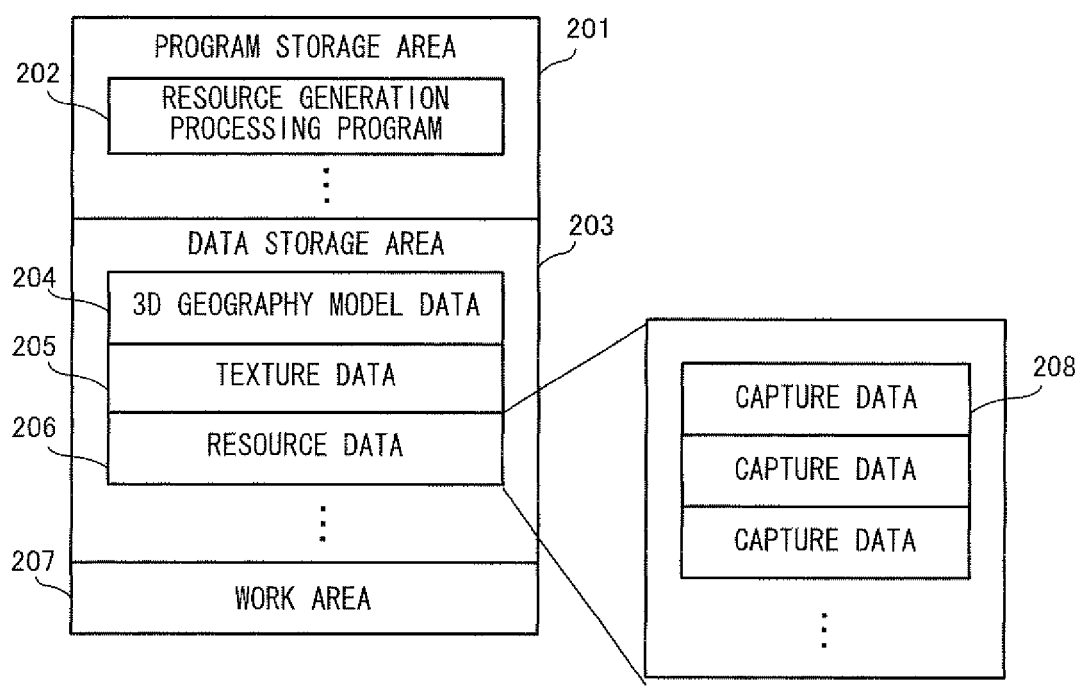
FIG. 11 shows a memory map of an external main memory 12 of the game apparatus 3 for the resource generation processing.

Next, processing according to the present embodiment will be described in detail. Firstly, data which is stored in the external main memory 12 of the game apparatus 3 when the resource generation processing is performed at the stage of development of the game, will be described. FIG. 11 shows a memory map of the external main memory 12 of the game apparatus 3 for the resource generation processing performed at the stage of development of the game. As shown in FIG. 11, the external main memory 12 includes a program storage area 201 and a data storage area 203. Note that although, in the present embodiment, the game apparatus 3 performs processing, an apparatus for development of the game is not limited thereto, and a personal computer or the like may be used as an apparatus for development. In this case, a program and data shown in FIG. 11 are stored in a memory of the personal computer.

In the program storage area 201, various programs for development of the game which are executed by the CPU 10 are stored, and one of the stored programs is a resource generation processing program 202.

In the data storage area 203, data such as 3D geography model data 204, texture data 205, and resource data 206 is stored. Moreover, in a work area 207, various variables and flags which are used for the resource generation processing are stored.

The 3D geography model data 204 is data of coordinates of vertices of various geographical polygons arranged in the virtual game space. The texture data 205 is used for setting a texture for the polygon generated based on the 3D geography model data 204, and includes texture designation data and texture color data, which are not shown. The texture designation data is used for associating the textures with the polygons, and the texture color data is used for designating colors of the textures.

The resource data is data of images used for generation of the overhead map, and is generated through the resource generation processing. The resource data 206 include a plurality of pieces of the capture data 208. The capture data 208 is data of the overhead images in the cells saved as the resources for the overhead map. The sizes of the overhead images coincide with the sizes of the cells. For example, if the size of the cell is 64×64 pixels, the size of the image is also 64×64 pixels. Here, in the present embodiment, a file name is assigned to each piece of the capture data 208 for the purpose of management, and the file name is determined in accordance with the following naming method. That is, center coordinates (represented by (x, y) in a two-dimensional coordinate system, when using FIG. 10 as an example) of a region, in the virtual game space, corresponding to each cell are included in the file name. In addition, in the case where plus and minus values are used for the coordinates, if a value of a coordinate is plus, "p" is included in the file name, and if a value of a coordinate is minus, "m" is included in the file name. For example, if coordinates (x, z), in the virtual game space, corresponding to the center of a cell are (32, 32), the file name of the corresponding piece of the capture data 208 is, for example, "map_p32_p32.xxx" (xxx represents one of extensions). Moreover, if coordinates are (−64, 128), the file name is "map_m64_p128.xxx", for example.

Figures 12, 13:
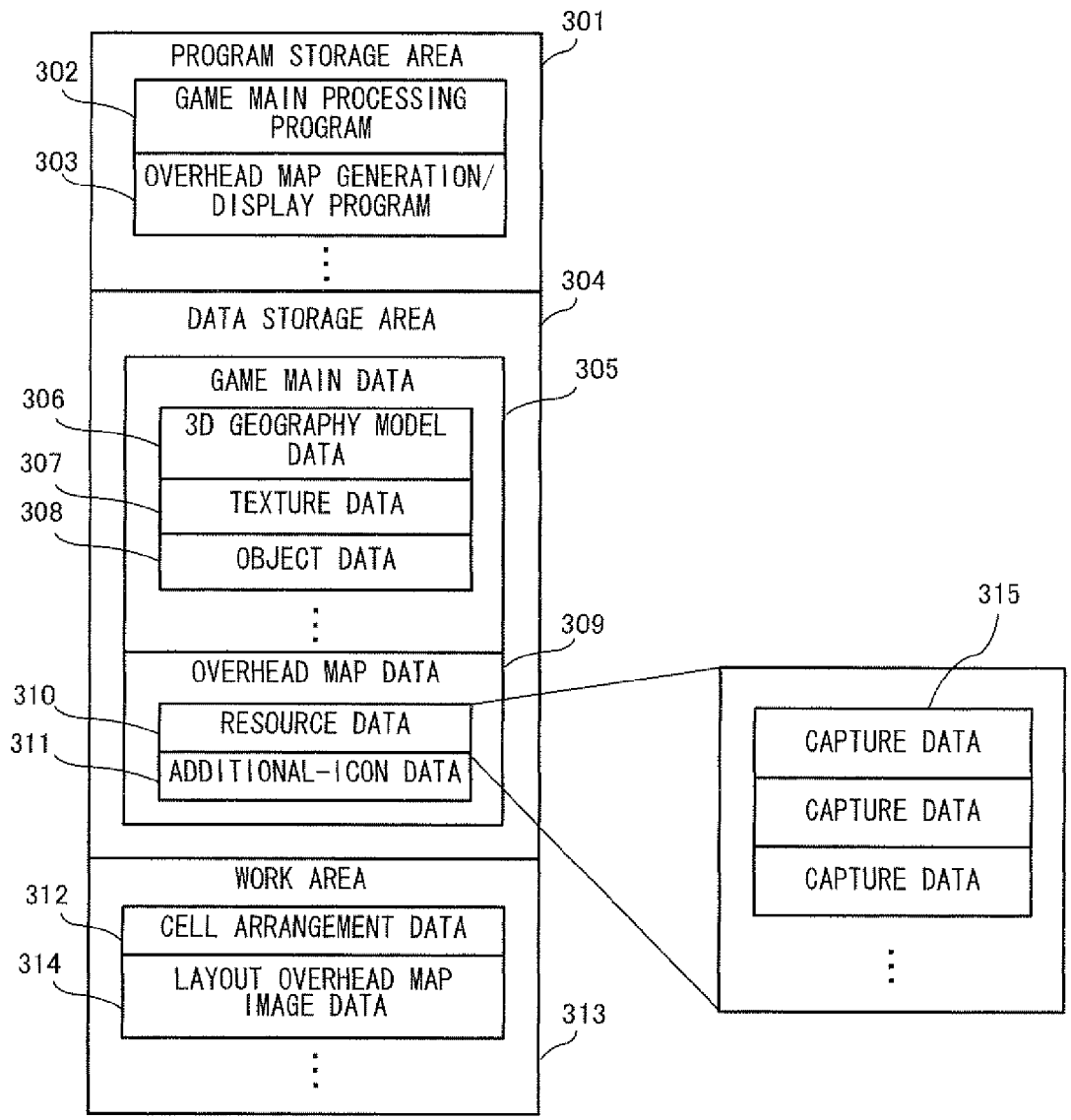
FIG. 12 shows a memory map of the external main memory 12 of the game apparatus 3 for game processing.
FIG. 13 shows an example of a configuration of cell arrangement data 312.

Next, data stored in the external main memory 12 of the game apparatus 3 at the stage of execution of the game will be described. FIG. 12 shows a memory map of the external main memory 12 of the game apparatus 3 for the game processing performed at the stage of execution of the game. As shown in FIG. 12, the external main memory 12 includes a program storage area 301 and a data storage area 304. Data in the program storage area 301 and the data storage area 304 is stored in the optical disc 4, and, when executing a game program, the data is transferred to and stored in the external main memory 12.

In the program storage area 301, a game program executed by the CPU 10 is stored, and the game program includes a game main processing program 302, an overhead map generation/display program 303, and the like. The game main processing program 302 is used for controlling the entire game processing according to the present embodiment. The overhead map generation/display program 303 is a program which is called up by the game main processing program 302, and is used for generating and displaying the overhead map.

In the data storage area 304, game main data 305, and overhead map data 309 are stored. Moreover, in a work area 313, cell arrangement data 312 and layout overhead map image data 314 are stored, and in addition, various variables and flags which are used for the game processing are stored.

The game main data 305 include 3D geography model data 306 and texture data 307 for constructing the virtual game space, and object data 308 used for various objects such as a player object In addition to these, game main data 305 include various data such as sound data used in the game processing.

The overhead map data 309 include resource data 310 and additional-icon data 311. The resource data 310 is the data generated in the resource generation processing, and include a plurality of capture data 315. The resource data 310 correspond to the resource data 206 generated at the stage of development of the game, and is stored as a part of data in the game to be released as a product. Therefore, a configuration and a content of the resource data 310 are the same as those of the resource data 206.

The additional-icon data 311 is image data of icons and the like which are additionally drawn on the overhead map image generated based on the resource data 310. For example, the additional-icon data 311 include image data of an icon of a flag indicating a destination of the player object 101.

The cell arrangement data 312 indicates information about cells arranged in two-dimensional array as shown in FIG. 10 and the like (i.e., cells used when the resource generation processing is performed). FIG. 13 shows an example of a data configuration of the cell arrangement data 312. The cell arrangement data 312 is generated by searching the entire capture data 315 in, for example, an initialization processing performed when starting execution of the game processing described later (i.e., at the stage of execution of the game). The cell arrangement data 312 include sets of cell numbers 3121, x-coordinates 3122, z-coordinates 3123, and resource existence flags 3124. The cell numbers 3121 are numbers assigned for uniquely identifying each cell, and are, in the present embodiment, when using FIG. 10 as an example, assigned from 0 in the order of scanning the cells from the upper left cell to lower right cell (note that, other than this, the cell numbers 3121 may be represented as two-dimensional array elements (x-coordinate, y-coordinate)). Moreover, the x-coordinates 3122 and the s-coordinates 3123 are information which indicates positions (x-coordinate, z-coordinate), in the virtual game space, corresponding to the cells (these coordinates correspond to those indicated by the file names of the capture data 208 and 315). The resource existence flags 3124 are information indicating whether or not there are the resources (capture data 315) corresponding to the cells. If there is a resource corresponding to a cell, "1" is set, and if there is not a resource corresponding to a cell, "0" is set. Note that in the present embodiment, the sizes of the cells are 64×64 pixels.

Referring to FIG. 12 again, the layout overhead map image data 314 is obtained by screen-capturing only an image of the overhead map created through processing described later. An image of the layout overhead map image data 314 is appropriately composited on a main game screen (which is drawn as a 3D image), whereby a final game screen is generated and displayed on the television 2.

Figure 14:
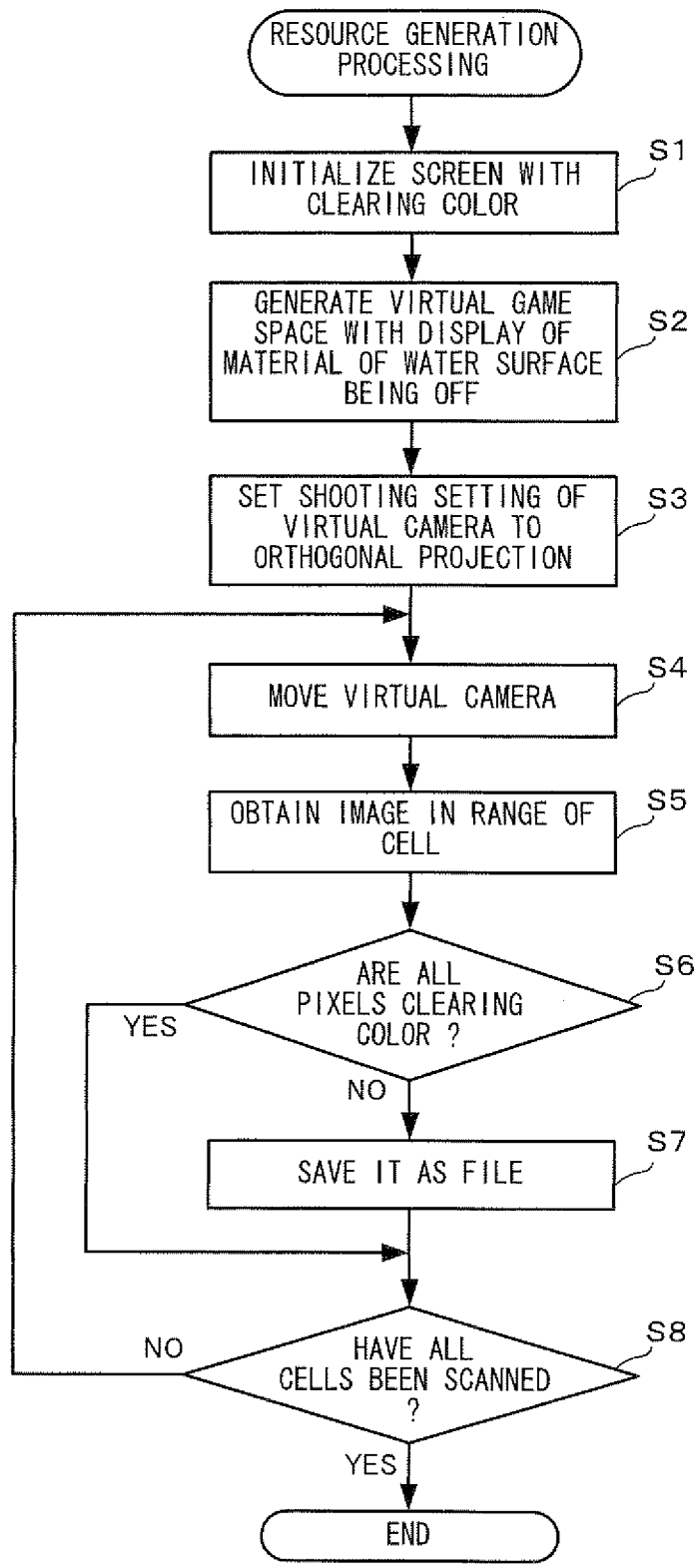
FIG. 14 is a flowchart showing, in detail, overhead map resource generation processing according to the embodiment of the present invention.

Next, processing according to the present embodiment will be described in detail. Firstly, referring to FIG. 14 to FIG. 19, the resource generation processing will be described in detail. FIG. 14 is a flowchart showing in detail the resource generation processing of the overhead map. Execution of this processing is appropriately started by a developer at the stage of development of the game. In the present embodiment, a sea (water surface) in the virtual game space is formed by a single color.

As shown in FIG. 14, first, in step S1, processing for clearing (painting), with a predetermined color (hereinafter, referred to as clearing color), a work screen (provided in frame buffer) which is a working area for drawing, is executed. The size of the work screen is the same as the size of a game screen.

Next, in step S2, the 3D geography model data 204 and the texture data 205 are read out to generate the virtual game space. Note that a material of a sea is not drawn. Next, in step S3, the virtual camera is set so as to perform shooting by orthogonal projection.

Figure 15:
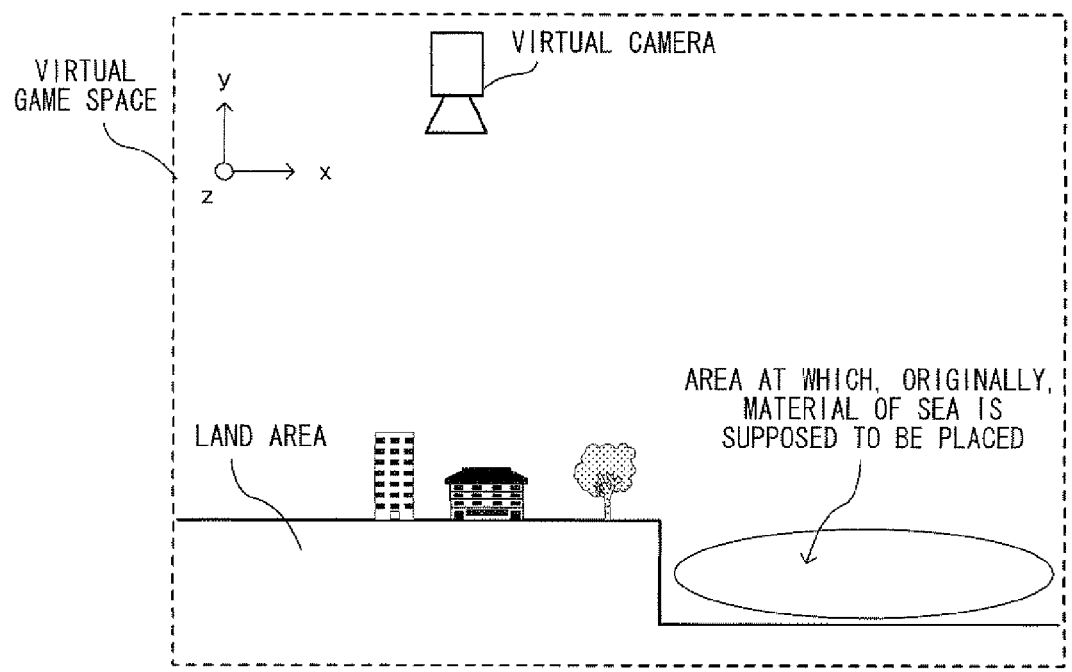
FIG. 15 is a drawing for explaining processing of step S4 in FIG. 14.
Figure 16:
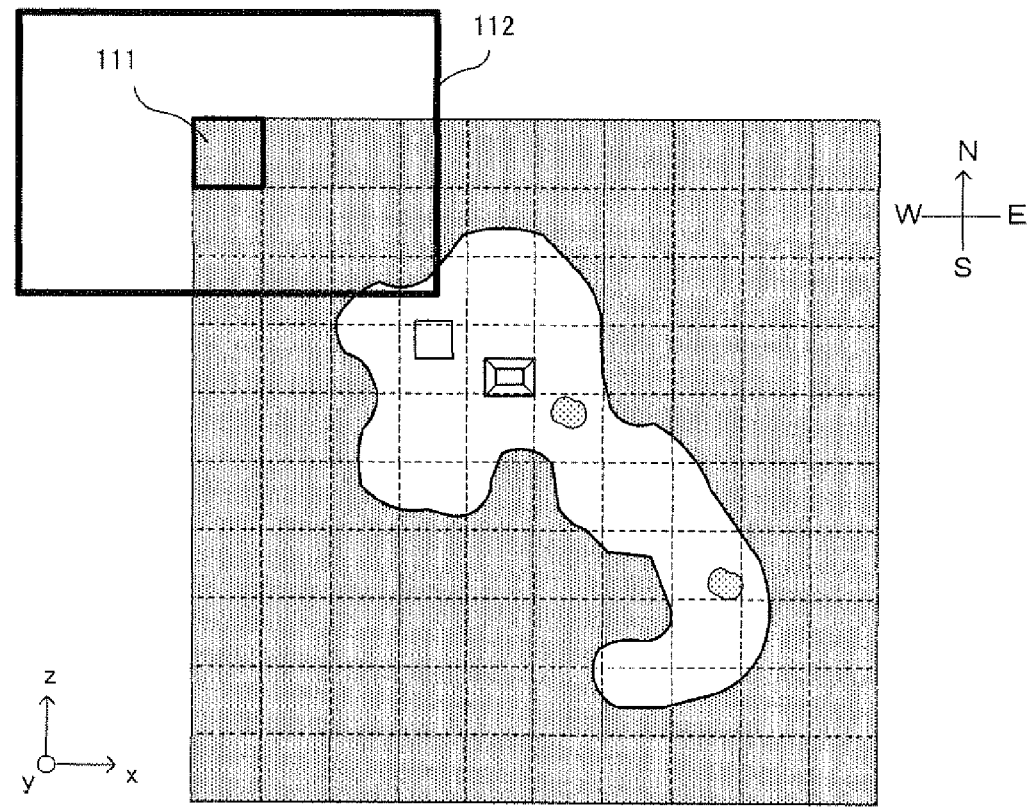
FIG. 16 is a drawing for explaining the processing of step S4 in FIG. 14.

Next, in step S4, the virtual camera is moved so as to correspond to a position of each cell shown in FIG. 10. Here, the movement of the virtual camera will be described in detail. First, as shown in FIG. 15, the virtual camera is moved to a position at which the virtual game space can be looked down upon from above, i.e., to a height at which the virtual game space can be looked down upon from (directly above. Next, while being kept at the height, the virtual camera is slid so as to correspond to a position of each cell shown in FIG. 10. For example, when performing processing of the present step for the first time after starting the resource generation processing, the virtual camera is moved so as to be at a predetermined starting position for shooting, that is, in this case, so as to be positioned at an uppermost and leftmost cell 111, as shown in FIG. 16. More properly, the virtual camera is moved such that the center of the cell 111 coincides with the center of a shooting range of the virtual camera.

Figure 17:
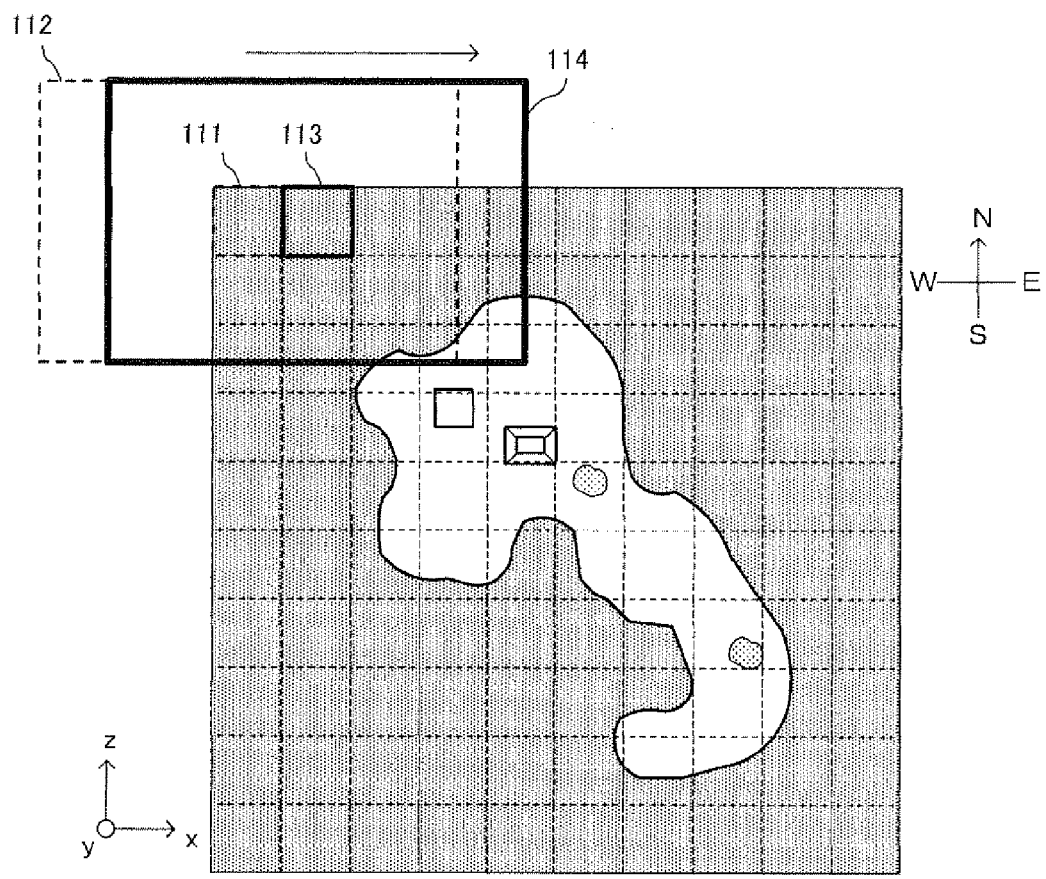
FIG. 17 is a drawing for explaining the processing of step S4 in FIG. 14.

Here, in the present embodiment, the sizes of the cells are 64×64 pixels, as described above. On the other hand, the size of an image shot by the virtual camera is the same as that of a screen displayed as a game screen. Therefore, a range of the image shot by the virtual camera (that is, the shooting range) is indicated by a frame 112 in FIG. 16. When performing the processing of the present step for the second time or more, the virtual camera is moved so as to scan on a cell-by-cell basis, as described above. For example, in the processing for the second time, the virtual camera is slid such that the center of the shooting range of the virtual camera coincides with the center of a cell 113 which is next to and on the right of the uppermost and leftmost cell 111, as shown in FIG. 17. Moreover, after the cells are scanned up to the rightmost cell, the virtual camera is moved such that the center of the shooting range of the virtual camera coincides with the center of a cell which is next to and below, the leftmost cell. For example, referring to FIG. 17, after the cells in the first row are scanned up to the rightmost cell, the virtual camera is moved to a position of the leftmost cell in the second row. As a result, the shooting range of the virtual camera is indicated by a frame 114.

Figure 18:
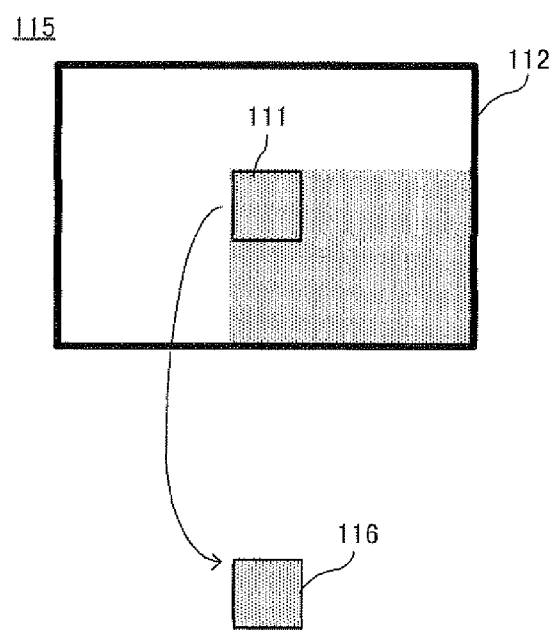
FIG. 18 is a drawing for explaining processing of step S5 in FIG. 14.

Referring to FIG. 14 again, next, in step S5, processing in which the virtual game space is shot with the virtual camera and an image corresponding to a range of the cell is obtained from the shot image, is executed. For example, at the first execution of the present processing, as shown in FIG. 18, an image 115 shot so as to have a size of the frame 112 is saved in the work area 207, and then, from the image 115, an image (hereinafter, referred to as cell image) 116 corresponding to the range of the cell is extracted.

Figure 19:
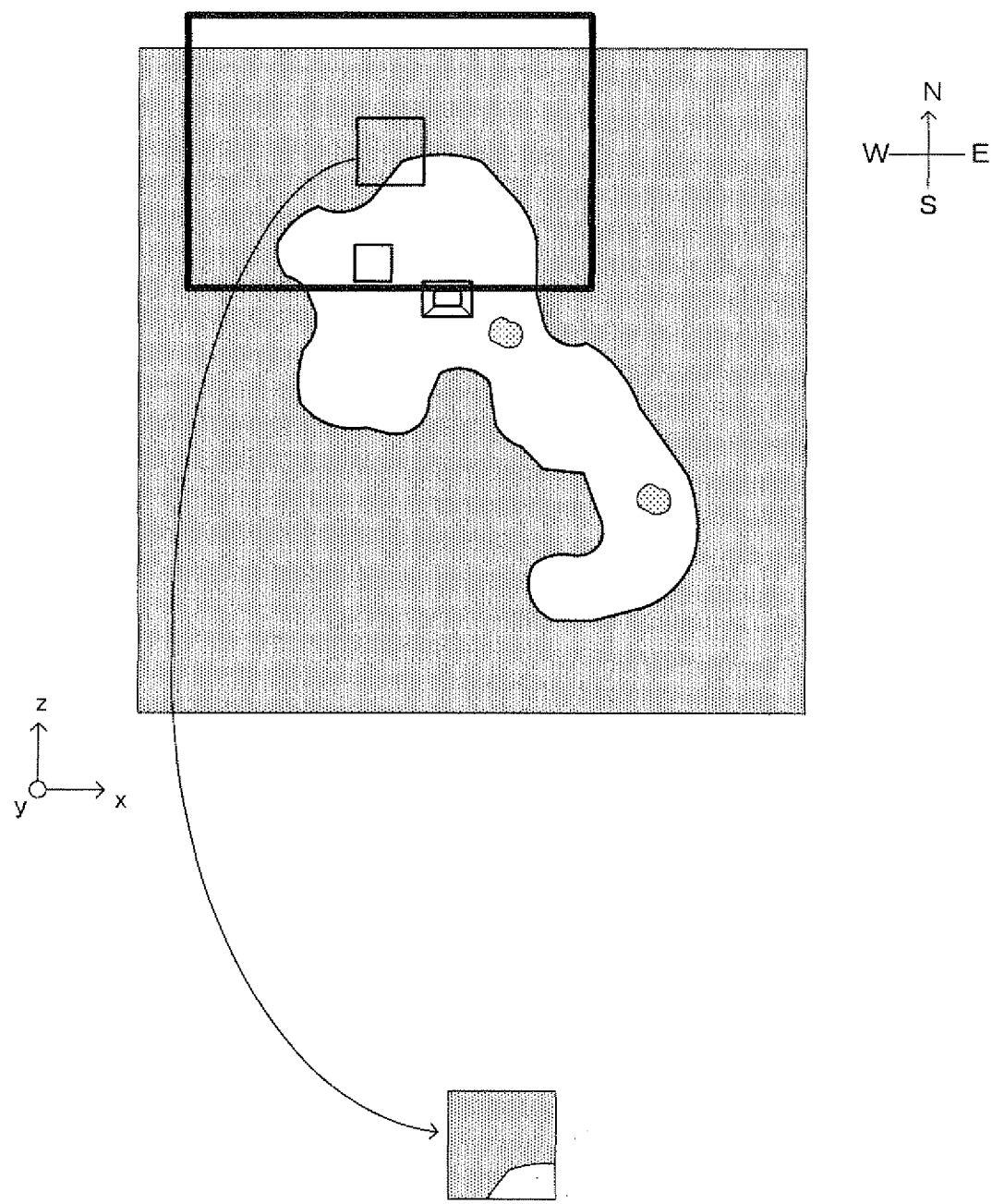
FIG. 19 is a drawing for explaining processing of step S6 in FIG. 14.

Referring to FIG. 14 again, next, in step S6, it is determined whether or not colors of all pixels of the cell image 116 are the clearing color. That is, cell images are sorted into cell images which should be made into resources and cell images which should not be made into resources. In the present embodiment, as described above, since the overhead image is shot by looking down upon, from directly above, the virtual game space in which a sea is not drawn, images of the cells which correspond to the sea surface include only the clearing color. In the result of the determination, if it is determined that colors of all the pixels are the clearing color (YES in step S6), since the cell image 116 is not made into a resource, processing proceeds to step S8. On the other hand, if it is determined that the cell image 116 has a pixel whose color is other than the clearing color (NO in step S6), since the cell image 116 is made into a resource, the cell image 116 is saved as the capture data 208. For example, as shown in FIG. 19, if there is a terrain in a part of a cell image, the cell image is to be saved as the capture data 208. Note that for saving, a file name of the capture data 208 is determined such that center coordinates of the cell are reflected in the file name.

Referring to FIG. 14 again, next, in step S8, it is determined whether or not the above described processing from shooting to sorting of a cell image is performed for all the cells shown in FIG. 10. In the result, if it is determined that there is a cell for which the processing is yet to be performed (NO in step S8), processing of step S4 is performed again. That is, the virtual camera is moved to a position of the next cell, the processing from shooting to sorting of a cell image is performed. On the other hand, if it is determined that the processing is performed for all the cells (YES in step S8), the resource generation processing is ended.

Figure 20:
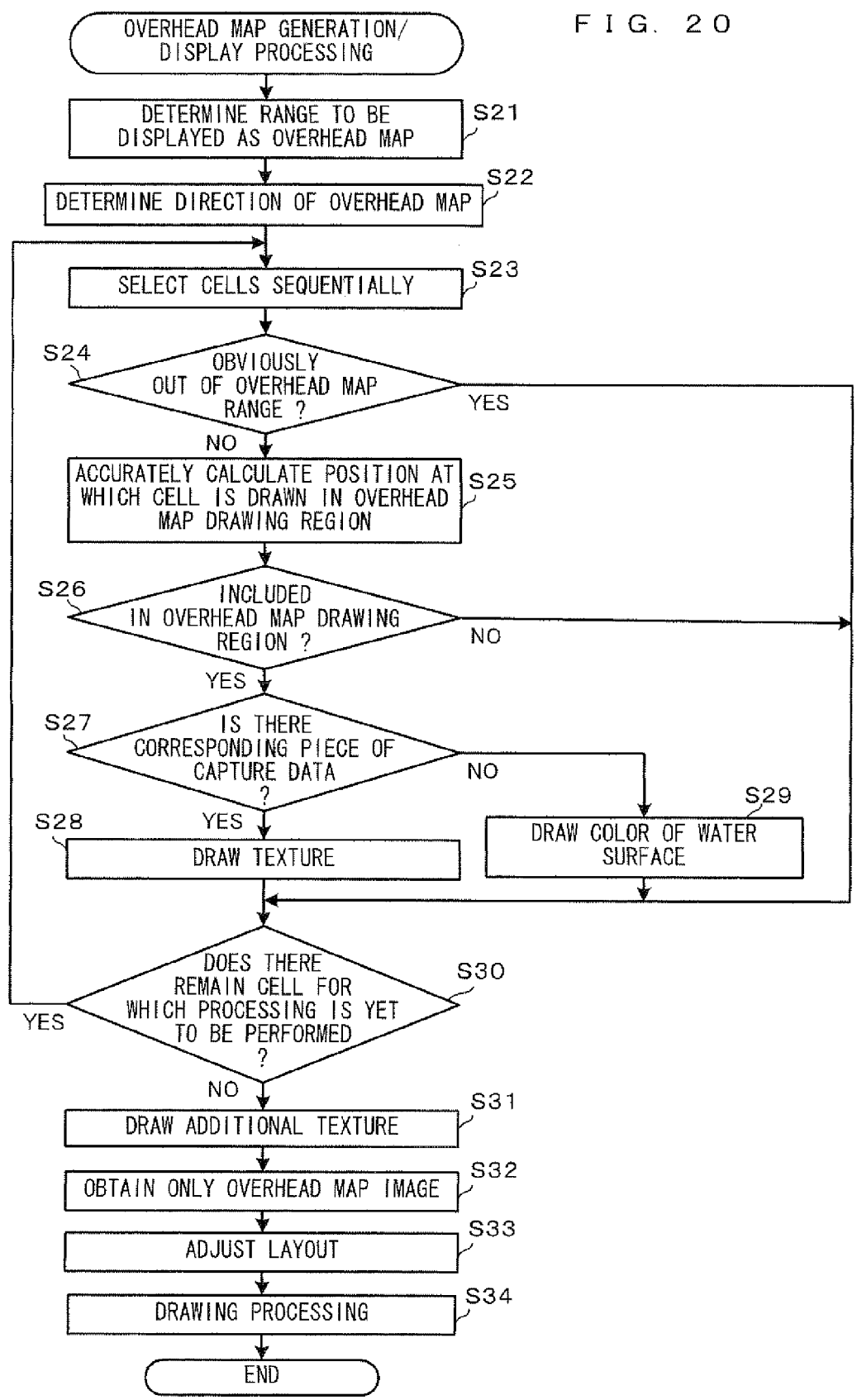
FIG. 20 is a flowchart showing, in detail, overhead map generation/display processing according to the embodiment of the present invention.

Next, referring to FIG. 20 to FIG. 27, overhead map generation/display processing which is executed by the game apparatus 3 will be described in detail. When the game apparatus 3 is powered on, the CPU 10 of the game apparatus 3 executes a start-up program stored in the ROM/RTC 13, and thereby each unit such as the external main memory 12 is initialized. The game program stored in the optical disc 4 is loaded into the external main memory 12, and then is executed by the CPU 10. The overhead map generation/display processing is executed as a part of the game program. On the other hand, before the execution of the overhead map generation/display processing, the cell arrangement data 312 as described above is generated based on the resource data 310, and stored in the work area 313. FIG. 20 is a flowchart showing the overhead map generation/display processing. Processing indicated by the flowchart is repeatedly executed on a frame-by-frame basis. Note that description of other game processing which is not directly relevant to the present invention is omitted.

Figure 21:
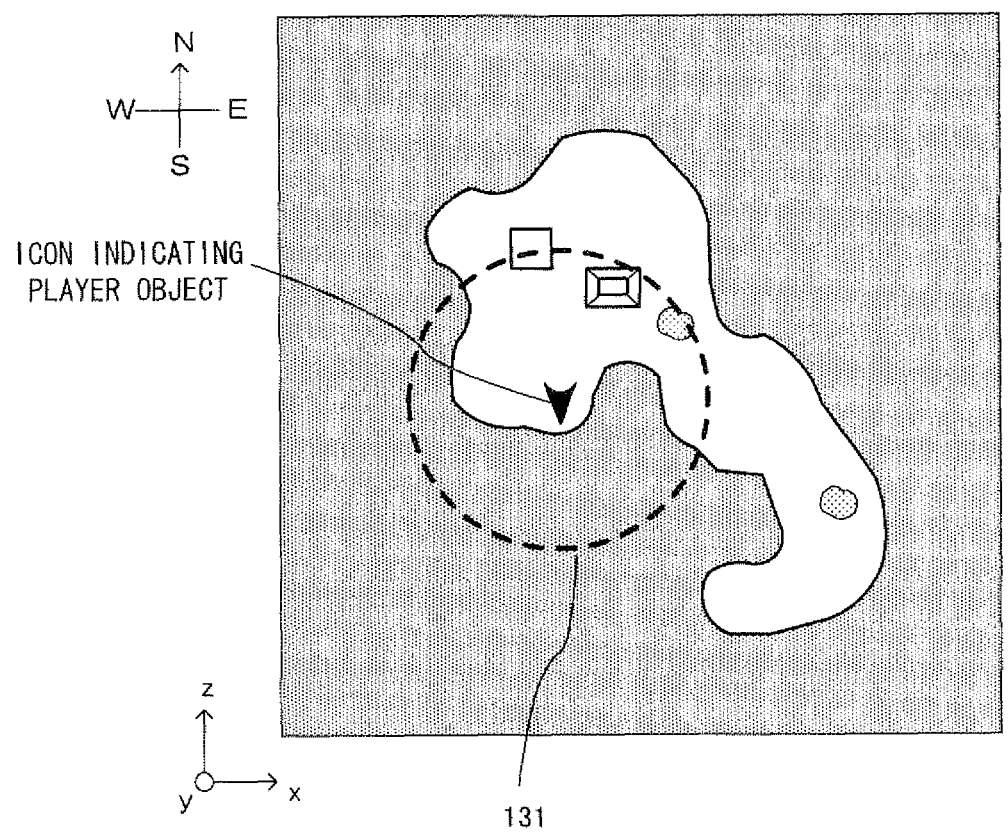
FIG. 21 is a drawing for explaining processing of step S21 in FIG. 20.
Figure 22:
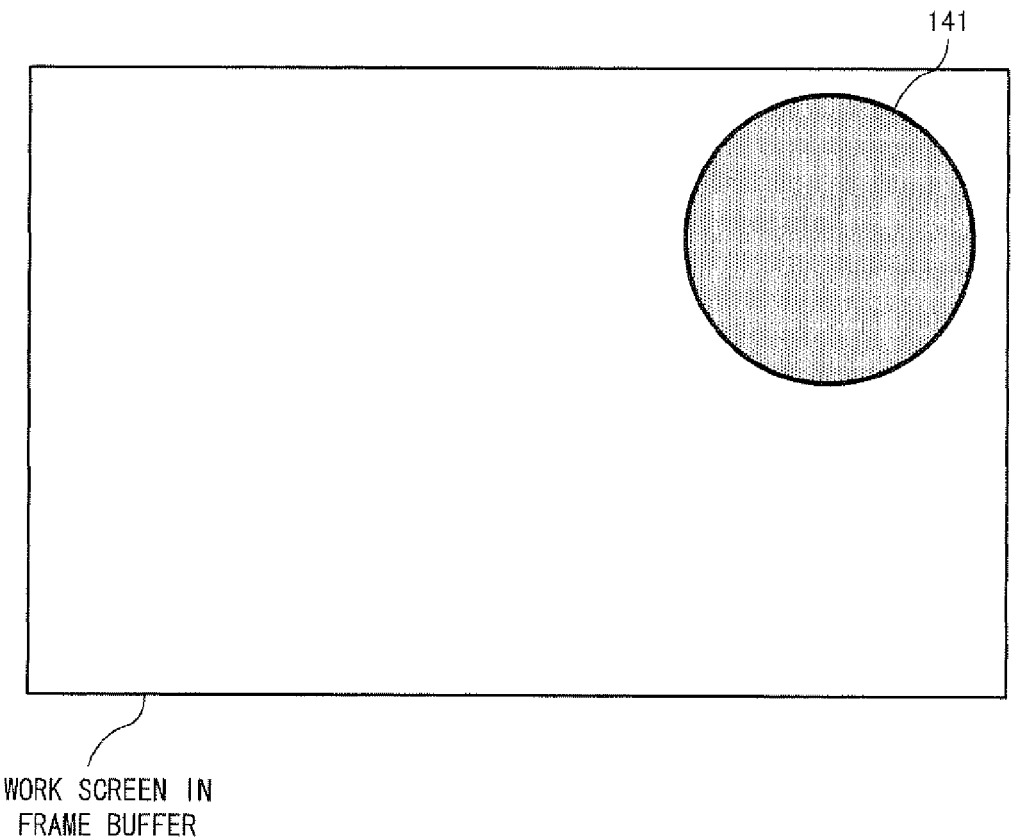
FIG. 22 is a drawing for explaining the processing of step S21 in FIG. 20.
Figure 23:
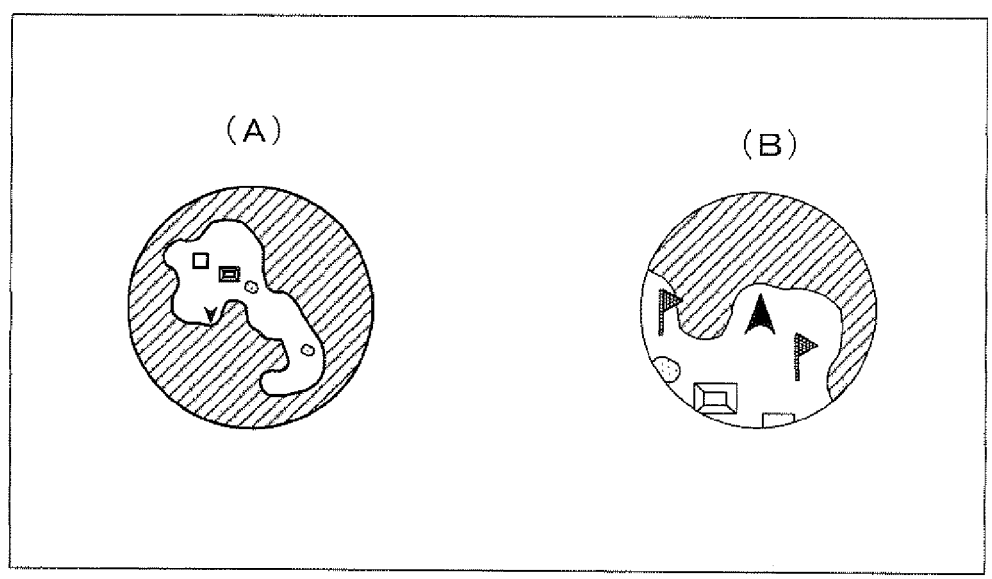
FIG. 23 is a drawing for explaining an enlargement factor.
Figure 24:
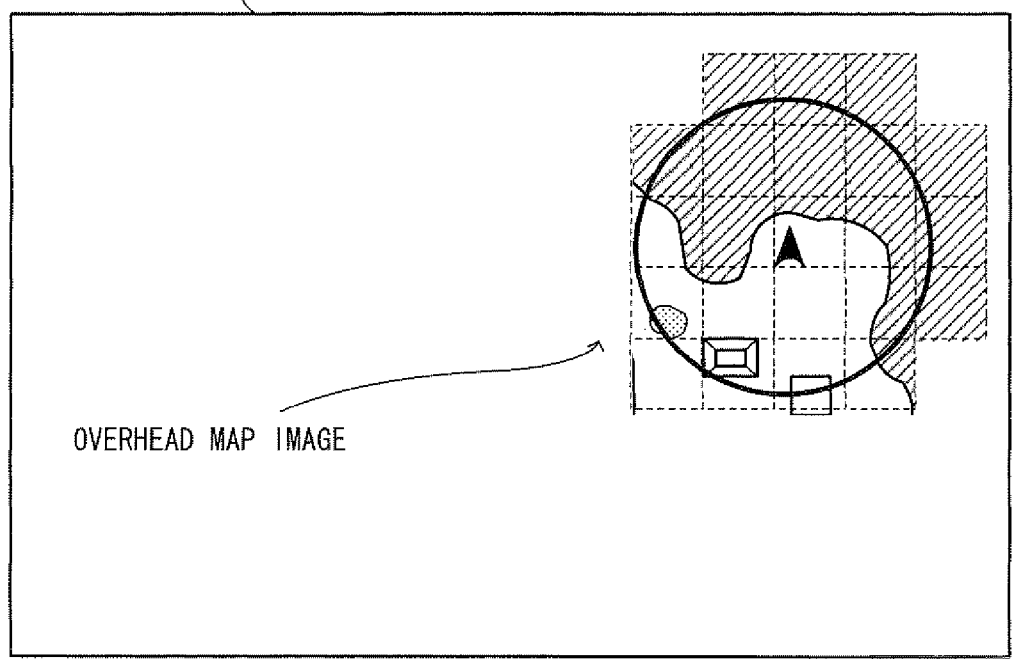
FIG. 24 is a drawing for explaining processing of step S30 in FIG. 20.

As shown in FIG. 20, first, in step S21, a range (hereinafter, referred to as overhead map range), in the virtual game space, which is displayed as the overhead map is determined based on a position of the player object 101 present in the virtual game space and an enlargement factor described later. In the present embodiment, the range displayed as the overhead map is a circular range (hereinafter, referred to as overhead map range) 131 whose center is a position of the player object 101, as shown in FIG. 21. Accordingly, here, a position (coordinates), in the virtual game space, corresponding to the center of the virtual map range 131 is determined. In addition, at this time, a region (hereinafter, referred to as overhead map drawing region) 141 in which the overhead map is drawn is provided in the frame buffer, as shown in FIG. 22 (note that, a position of the overhead map is a temporarily determined position).

A radius (or diameter) of a circle which makes the overhead map range 131 is determined in accordance with the enlargement factor. In the present embodiment, a range, in the virtual game space, displayed as the overhead map can be enlarged or reduced, and the enlargement factor is a parameter for determining the range. Note that the term "enlarge" mentioned here is used in the sense of enlarging a range of the overhead map which can be recognized by the player. Therefore, when the enlargement factor is set to a high value, a broader range in the virtual game space is displayed in the overhead map, and when the enlargement factor is set to a maximum value, the overhead map is displayed such that the whole of the island can be recognized (see FIG. 23 (A)). On the other hand, when the enlargement factor is set to a low value, the overhead map is displayed such that only a periphery of the player object can be recognized (see FIG. 23 (B)). Note that the enlargement factor can be changed by the player performing a predetermined operation during the game. Moreover, in accordance with the enlargement factor, the size of the overhead map range 131 is also determined.

Referring to FIG. 20 again, next, in step S22, the direction of the overhead map is determined in accordance with the direction in which the player object faces in the virtual game space. In the present embodiment, the overhead map is displayed such that the upward direction on the overhead map coincides with the direction (for example, represented by using a direction based on north, south, east, and west in the virtual game space) in which the player object 101 faces. For example, when the direction in which the player object 101 faces is the "southerly" direction in the virtual game space, the upward direction on the overhead map is set to be the "southerly" direction in the virtual game space.

Next, in step S23, one cell is selected from the cells (more properly, regions, in the virtual game space, corresponding to the cells) shown in FIG. 10. In the present embodiment, the order of the selection is such that the cells are selected in the order of scanning the cells from the upper left cell to lower right cell. In the result, through loops of processing from step S23 to S30 described below, one cell is selected per one loop in the above-described order. In the present embodiment, the cells are selected in the order indicated by the cell numbers 3121 in the cell arrangement data 312. Note that the position of the cell to be selected, i.e., the size of the region, in the virtual game space, which is to be selected, may be determined by using the cell arrangement data 312, or otherwise, for example, data indicating the sizes of the cells may be defined in advance and the size of the region may be calculated by using the data indicating the size of the cell. When the uppermost and leftmost cell is selected in first-time processing of step S23, a position of a cell which is next to and on the right of the cell may be calculated based on the defined sizes of the cells, and the cell at the position may be determined as a next cell to be selected, in second-time processing of step S23.

Next, in step S24, it is determined whether or not the cell selected in step 23 (i.e., a region, in the virtual game space, corresponding to the cell) is included in the overhead map range 131. At this stage of processing, a position where the cell is to be drawn (placed) in the overhead map drawing region 141 in the frame buffer is yet to be accurately calculated. Processing for accurately calculating a position where the cell is to be drawn in the overhead map drawing region 141 is executed later. In step S24, in order to reduce the amount of processing for the calculation, a determination for excluding a cell which is obviously out of the overhead map range 131 from targets of calculation processing is performed. Note that the case where a cell is "obviously out of the overhead map range" represents the case where the cell is not included in the overhead map range 131 whichever direction the player object 101 faces in. For example, if a cell is included in the overhead map range 131 when the player object 101 at a certain position in the virtual game space faces in the northerly direction (note that, the northerly direction is defined in the virtual game space), and if the cell is not included in the overhead map range 131 when the player object 101 at the certain position in the virtual game space faces in the southerly direction, it is determined that the cell is included in the overhead map range 131 (that is, if there is a possibility that a cell may be included in the overhead map range 131, the cell is not excluded). On the other hand, if a cell is not included in the overhead map range 131 even when the player object 101 faces in the northerly, southerly, or even easterly or westerly direction, it is determined that the cell is "obviously out of the overhead map range". More specifically, if a cell satisfies the following conditional expression, it is determined that the cell is out of the overhead map range 131.

$$(|Cell\_X - PL\_X| - Cell\_Leng) \times \text{Enlargement Factor} > \text{Radius of Overhead Map Range}$$

and $$(|Cell\_Z - PL\_Z| - Cell\_Leng) \times \text{Enlargement Factor} > \text{Radius of Overhead Map Range}$$

In the above conditional expression, Cell_X represents an x-coordinate of the upper left corner of (a region, in the virtual game space, corresponding to) a cell. Similarly, Cell_Z represents a z-coordinate of the upper left corner of the cell. Note that when using FIG. 10 as an example, the x-axis and the z-axis correspond to a lateral direction and a longitudinal direction, respectively. In addition, an upward direction (positive direction of the z-axis) is the northerly direction. PL_X and PL_Z represent an x-coordinate and a z-coordinate of the position of the player object in the virtual game space, respectively. Cell_Leng represents a distance, in the virtual game space, corresponding to a length of a side of the cell. Note that Enlargement Factor is the above-described enlargement factor of the overhead map, which is set in advance by the player.

As a result of the step S24, if it is determined that the cell selected in step S23 is (obviously) out of the overhead map range 131 (YES in step S24), processing proceeds to step S30 to select another cell. On the other hand, if it is determined that the cell selected in step S23 is included in the overhead map range 131 (NO in step S24), next, in step S25, the position where the cell is to be drawn (placed) in the overhead map drawing region 141 (see FIG. 22) is accurately calculated. More specifically, first, a plate-shaped polygon corresponding to the cell is generated (the size of the polygon is determined in accordance with the enlargement factor). Next, in accordance with the direction of the player object, a calculation for rotating and moving the polygon is performed, and thereby the position (in other words, the position where the cell is to be drawn) where the polygon is to be drawn in the overhead map drawing region 141 is calculated.

Next, in step S26, it is determined whether or not the position, where the cell is to be drawn, calculated in step S25 is included in the overhead map drawing region 141. Here, since the position where the cell is to be drawn in the overhead map drawing region 141 has been accurately calculated in step S25, even if it is determined that the cell is included in the overhead map range 131 in step S24, it might be determined that the cell is out of the overhead map drawing region 141 in step S26 (especially, in the case where cells having a small size are used). Note that if only a part of a cell is included in the overhead map drawing region 141, it is determined that the cell is included in the overhead map drawing region 141. In the result of the determination, if it is determined that a cell is not included in the overhead map drawing region 141 (NO in step S26), processing proceeds to step S30 described later.

On the other hand, in the result of the determination in step S26, if it is determined that the accurately calculated position where the cell is to be drawn is included in the overhead map drawing region 141 (YES in step S26), next, in step S27, the resource existence flag 3124 is referred to and thereby it is determined whether or not there is a piece of the capture data 315 which corresponds to the cell. That is, it is determined whether or not a value of the resource existence flag 3124 which corresponds to the cell is "1". In the result of the determination, if the value of the resource existence flag 3124 which corresponds to the cell is "1" (YES in step S27), in step S28, the plate-shaped polygon is placed in the overhead map drawing region 141. Moreover, the piece of the capture data 315 is read out and an image (i.e., texture) indicated by the piece of the capture data 315 is drawn on the placed polygon. On the other hand, if the value of the resource existence flag 3124 which corresponds to the cell is "0" (NO in step S27), in step S29, the plate-shaped polygon is placed in the overhead map drawing region 141, and a predetermined color (in the present embodiment, color of water surface) is drawn on the plate-shaped polygon (i.e., the color of water surface is painted).

Figure 25:
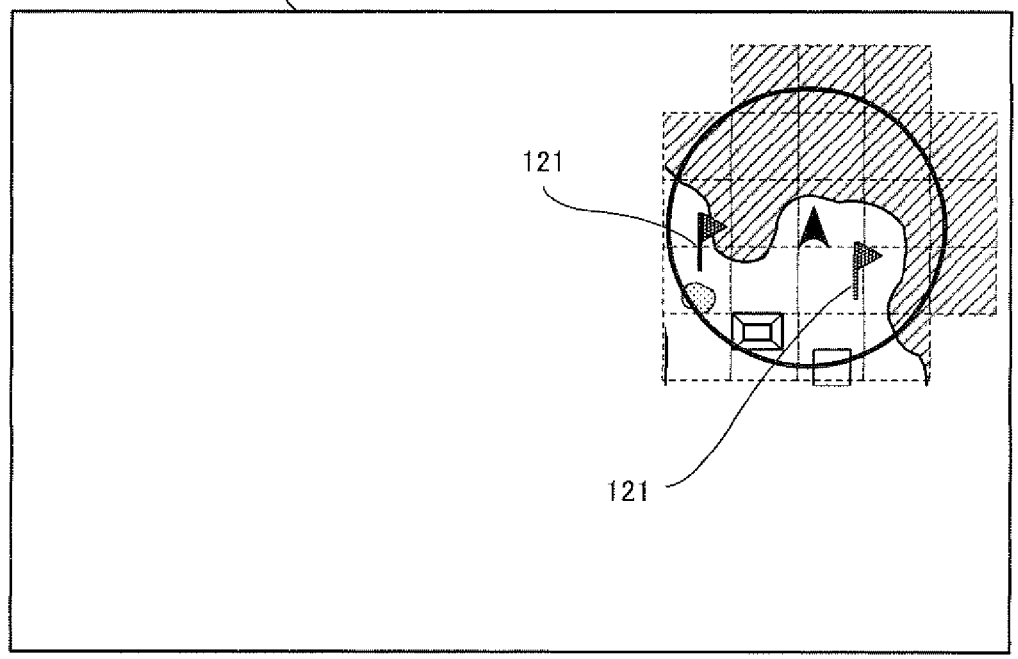
FIG. 25 is a drawing for explaining processing of step S31 in FIG. 20.

Next, in step S30, it is determined whether or not there remains a cell for which the above-described processing is yet to be performed. In the result, if it is determined that there remains such a cell (YES in step S30), processing returns to step S23 to select a next cell and the above-described processing is performed again. On the other hand, if processing from steps S23 to S29 has been performed for all the cells (NO in step S30), an image shown, for example, in FIG. 24 has been generated as an image for the overhead map in the frame buffer. In this case, in next step S31, processing for drawing an additional texture on the overhead map image is executed. The additional texture is an image of, for example, a mark, such as an icon 121 of flag indicating a destination as shown in FIG. 25, which is needed depending on the progression of the game, and the additional texture is generated based on the additional-icon data 311.

Figure 26:
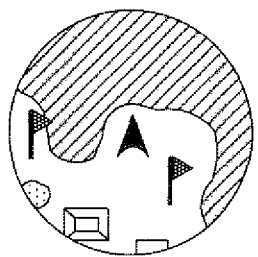
FIG. 26 is a drawing for explaining processing of step S32 in FIG. 20.
Figure 27:
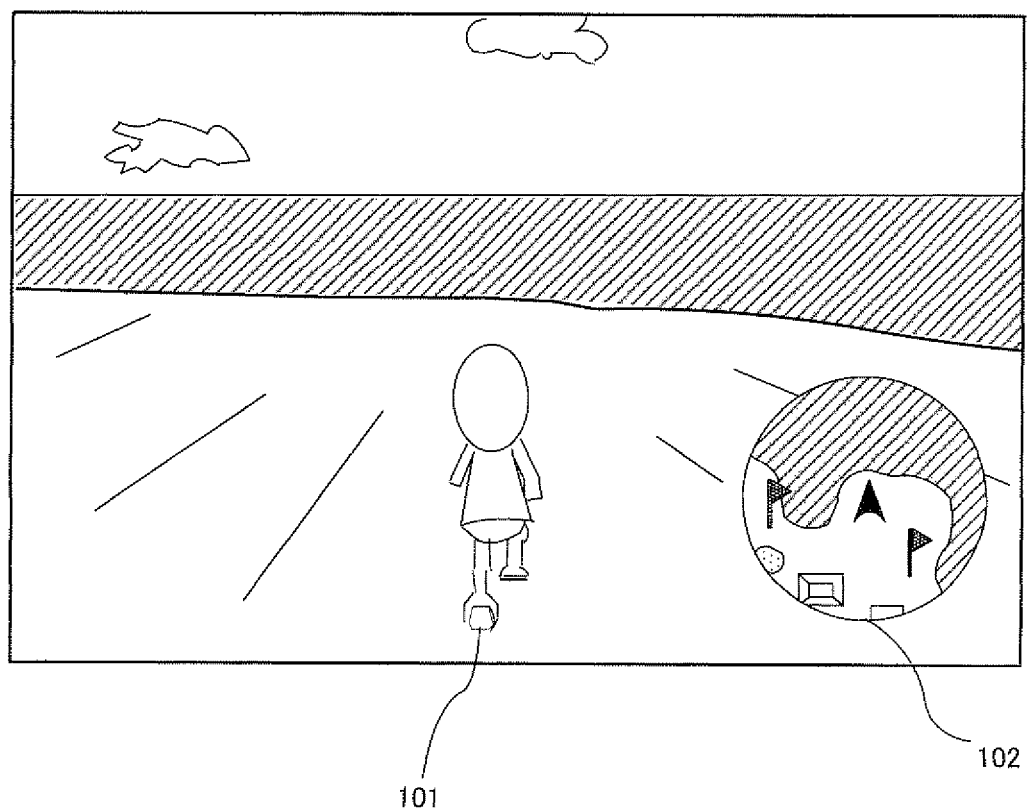
FIG. 27 is a drawing for explaining processing of step S34 in FIG. 20.

Referring to FIG. 20 again, next, in step S32, processing in which a circular image to be displayed as the overhead map as shown in FIG. 26 is screen-captured from the work screen in the frame buffer, and then is saved in the work area 313 as the layout overhead map image data 314, is executed.

Referring to FIG. 20 again, next, in step S33, an adjustment of layout on a game screen which is finally displayed is performed. Specifically, setting of transparency (alpha value) and/or processing (smoothing or anti-aliasing) for smoothing an outline are performed for the layout overhead map image data 314, and then a position, on the game screen, where the overhead map image is finally displayed is determined.

Next, in step S34, drawing processing is executed. That is, a game screen (see FIG. 27) obtained by displaying the overhead map image on the main game screen in an overlapped manner, is displayed on the television 2. The overhead map generation/display processing is ended here.

As described above, in the present embodiment, when generating data (image data the virtual game space looked down upon from above) which is to be resources for the overhead map, a 3D geography model is generated without drawing a material of a sea. In addition, processing is performed such that, of an image obtained by shooting the 3D geography model from above with the virtual camera, a part which satisfies a predetermined condition (that colors of all pixels in the part are identical) is not made into resources. Thus, the amount of data used as a resource can be reduced, in comparison with, for example, the case where image data including, as one picture, the whole (including both an island and a sea) of the virtual game space which has been shot from above is made into a resource.

Moreover, in the case where image data including, as one picture, the whole of the virtual game space which has been shot from above is created and saved, the size of the entire island, a balance of the size in the virtual space, a center position of a range, in the three-dimensional space, which is to be shot from directly above, and the like need to be adjusted. However, in the present invention, a developer does not need to consider the size of the entire island and the like, and for example, even if the shape of the island is changed or an isolated island is newly added, it is only necessary to execute the above-described resource generation processing again. Therefore a burden of work of development on a developer can be reduced.

Moreover, in the present embodiment, processing for generating/drawing the overhead map in the game processing is such that only a range, around the player object 101, which is needed for the overhead map is extracted and drawn. Thus, it becomes possible to prevent unnecessary drawing processing from being executed, and thereby load of processing can be reduced. In addition, if a certain part is included in the overhead map range and there is not a corresponding piece of data to be made into a resource of the overhead map, since a predetermined color (e.g., color of water) is drawn for the certain part, it becomes possible to generate the overhead map image bringing no feeling of strangeness. In other words, if a certain part is included in the overhead map range and there is not a corresponding piece of data to be made into a resource of the overhead map, since it is not necessary to draw a texture for the certain part, the amount of processing for generation of the overhead map can be further reduced (generally, for example, in the case of performing processing for simply painting a predetermined single color for a polygon corresponding to a cell in the sea surface, since processing for reading out a texture is not needed, the amount of processing can be reduced, in comparison with the case of performing processing for drawing a texture of the sea surface).

Note that the size of a cell, i.e., the size of an image saved as capture data is not limited to 64×64 pixels described above, and needless to say, other than this size, 32×32 pixels, 128×128 pixels, or the like may be used. The size may be appropriately determined in accordance with a content of a game. For example, in a game using only a particular enlargement factor, a cell having a size determined in accordance with a content of game may be used.

Moreover, in the above embodiment, the virtual game space is shot such that the shot range coincides with the size of a screen (a size of the game screen), only a range corresponding to the cell is extracted from the shot image, and the above-described determination for sorting the cell is performed. Other than this, shooting may be performed after the shooting range is adjusted to the size of the cell at the start. In this case, there is an advantage that the amount of processing for generation of resources is reduced. On the other hand, as described in the above embodiment, in the case where: the virtual game space is shot such that the shot range coincides with the size of a screen (a size of the game screen); and of the shot image, only a range corresponding to the cell is used for the above-described determination for sorting the cell, setting of the virtual camera used in other development processes can be used for setting for the shooting range as well. Therefore, there is an advantage that it is not necessary to separately develop a program of shooting processing only for resource generation processing, and that a burden on a developer can be reduced.

Moreover, in the above embodiment, a range corresponding to a sea is excluded from targets to be made into resources, in the resource generation processing, and a color of a sea (water surface) is drawn on a polygon of a cell which is not made into a resource, in the overhead map generation/display processing. Other than a geographical object such as the sea described above, for example, in the case where most range of the virtual game space is formed by a desert, a color (color of sand) of a desert may be used instead of the color of a sea to perform the above-described processing. Other than these, the above-described processing may be applied to a geographical object formed by only a color which, it is considered when looking down upon the virtual game space from directly above, is most commonly used in the virtual game space.

Moreover, in the above embodiment, the case where a single color is used for a sea in the virtual game space is described as an example. Other than this, for example, in the case where a plurality of colors which are slightly different in tone from each other are used for a sea, these colors may be considered as substantially identical to each other and may be treated as a single color. In this case, in a determination whether or not a single color is used for pixels of a cell image in the above-described resource generation processing, even when it is determined that a plurality of colors are used, if differences in tone among these colors are smaller than a predetermined degree, it may be determined that a single color is used for the pixels of the cell image.

Moreover, in the above embodiment, when there is not a piece of the capture data 315 corresponding to a cell, a color of water surface is drawn on a plate-shaped polygon for the cell. Other than this, a plate-shaped polygon on which a color of water surface is drawn may be provided to each cell in advance, and, when there is a piece of the capture data 315 corresponding to a cell, a content of the corresponding piece may be drawn, in an overwritten manner, on the polygon of the cell on which the color of water surface has been drawn.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an overhead map resource generation program which is executed by a computer of a map data resource generation apparatus for generating an image data resource to be used in displaying a two-dimensional map corresponding to an overhead view of a particular region of a virtual three-dimensional space, the overhead map resource generation program causing the computer to perform operations comprising:

acquiring overhead images of a plurality of sub-regions of a predetermined region in the virtual three-dimensional space by shooting separate images of each sub-region from a viewpoint of an overhead virtual camera provided in the virtual three-dimensional space;

determining whether color information included in the acquired overhead image satisfies a predetermined condition; and generating map image resource data by storing and accumulating, in a predetermined storage medium, only acquired overhead images which contain color information that does not satisfy the predetermined condition, wherein information processing operations performed for said acquiring, determining and generating map image resource data are repeated for each of said plurality of sub-regions until overhead images of all sub-regions comprising the predetermined region in the virtual three-dimensional space are processed.

2. The computer-readable storage medium having stored therein the overhead map resource generation program according to claim 1, wherein the overhead map resource generation program further causes the virtual camera to move in the virtual three-dimensional space in accordance with a predetermined shooting condition, and wherein an overhead image of a region in the virtual three-dimensional space is acquired with the virtual camera being moved.

3. The computer-readable storage medium having stored therein the overhead map resource generation program according to claim 1, wherein the overhead map resource generation program further causes the computer to generate a stored resource of object or image data that may be utilized in drawing, among geographical objects to be included in the virtual three-dimensional space, a particular geographical object in place of drawing a predetermined kind of geographical object, and thereby generate a virtual three-dimensional space wherein only the particular geographic object is drawn without drawing the predetermined kind of geographic object, and wherein one or more images of the virtual three-dimensional space generated from a viewpoint of an overhead virtual camera.

4. The computer-readable storage medium having stored therein the overhead map resource generation program according to claim 3, wherein the virtual three-dimensional space is generated by using a predetermined single color for a background color and drawing a geographical object other than the predetermined kind of geographical object.

5. The computer-readable storage medium having stored therein the overhead map resource generation program according to claim 1, wherein the predetermined condition is satisfied when all pixel values of the acquired overhead image indicate an identical color.

6. The computer-readable storage medium having stored therein the overhead map resource generation program according to claim 3, wherein when the overhead image includes a plurality of colors, among the plurality of colors, colors whose difference in tone is smaller than a predetermined degree are determined to be an identical color.

7. The computer-readable storage medium having stored therein the overhead map resource generation program according to claim 2, wherein the virtual camera is moved such that regions in the virtual three-dimensional space which are acquired by the virtual camera do not overlap with each other.

8. The computer-readable storage medium having stored therein the overhead map resource generation program according to claim 7 wherein, under an assumption that an image shot by looking down upon the virtual three-dimensional space from above so as to include the whole of the virtual three-dimensional space in one image divided into squares having a predetermined size in a form of lattice, the virtual camera is moved on a square-by-square basis.

9. The computer-readable storage medium having stored therein the overhead map resource generation program according to claim 1, wherein the image data is accumulated together with information indicating a position in the virtual three-dimensional space corresponding to the acquired overhead image, the information being attached to the image data.

10. The computer-readable storage medium having stored therein the overhead map resource generation program according to claim 1, wherein the overhead image is obtained by shooting the virtual three-dimensional space by a method of orthogonal projection.

11. The computer-readable storage medium having stored therein the overhead map resource generation program according to claim 2, wherein a distance by which the virtual camera is moved is determined in accordance with an image size of the image data accumulated by the resource data generation means.

12. A non-transitory computer-readable storage medium having stored therein a virtual image data resource generation and overhead map display program which is executed by a computer of a display apparatus for generating an image data resource to be used in displaying a two-dimensional map corresponding to an overhead view of a predetermined region within a virtual three-dimensional space, a data storage being accessible to the computer for storing image data, wherein the resource generation and overhead map display program causes the computer to:
  execute a process of repeatedly acquiring a separate image of each of a plurality of sub-regions of a predetermined region in the virtual three-dimensional space from a viewpoint of an overhead virtual camera which is moved in the virtual three-dimensional space in a predetermined manner to cover substantially all of the predetermined region;
  accumulate virtual image resource data by storing only acquired image data whose color information does not satisfy a predetermined condition;
  select predetermined image data from accumulated resource data;
  generate an overhead map based on the selected image data; and
  display the overhead map on a display apparatus.

13. A non-transitory computer-readable storage medium having stored therein a virtual world overhead map image data resource generation and display program which is executed by a computer of a display apparatus for creating a resource of virtual world map image data to be used in displaying a two-dimensional map corresponding to an overhead view of a virtual world in a virtual three-dimensional space, a data storage being accessible to the computer for storing map image resource data, wherein the virtual world overhead map image data resource generation and display program causes the computer to:
  execute a process for repeatedly acquiring a separate image of each of a plurality of sub-regions of a predetermined region in the virtual three-dimensional space from a viewpoint of an overhead virtual camera which is moved in the virtual three-dimensional space in a predetermined manner, together with acquiring information indicating a position in the virtual three-dimensional space corresponding to each acquired image;
  accumulate virtual image overhead map resource data by storing only acquired image data whose color information does not satisfy a predetermined condition;
  obtain a position, in the virtual three-dimensional space, corresponding to a predetermined display position in an overhead map of the virtual world;
  determine whether image data corresponding to the position obtained in the virtual three-dimensional space was accumulated and stored as virtual image overhead map resource data; and
  if corresponding image data is determined as having been stored as virtual image overhead map resource data, obtain said corresponding image data from the data storage and display a corresponding image at the predetermined display position in the overhead map, and if said corresponding image data is determined as not having been stored as virtual image overhead map resource data, display a predetermined image at the predetermined display position in the overhead map.

14. The non-transitory computer-readable storage medium according to claim 13, wherein
  the overhead map image data resource generation and display program further causes the computer to perform a first overhead map out-of-range determination, based on a position of a player object and a predetermined drawing range, of whether the obtained position in the virtual three-dimensional space is out of a range, in the virtual three-dimensional space, which is drawn as the overhead map, and
  perform a resource existence determination, only if the first overhead map out-of-range determination determines that the position in the virtual three-dimensional space is not out of the range of the overhead map, of whether a piece of the image data corresponding to the position in the virtual three-dimensional space is included in the resource data.

15. The non-transitory computer-readable storage medium according to claim 14, wherein the first overhead map out-of-range determination determines, based on the position of the player object, the predetermined drawing range, and an enlargement factor of the overhead map, whether the obtained position in the virtual three-dimensional space is out of a range, in the virtual three-dimensional space, which is displayed as the overhead map.

16. The computer-readable storage medium according to claim 14, wherein the overhead map image data resource generation and display program further causes the computer to perform a second overhead map out-of-range determination, based on a direction of the player object, of whether the obtained position in the virtual three-dimensional space which the first overhead map out-of-range determination determines is not out of the overhead map is included in the range, in virtual three-dimensional space, which is drawn as the overhead map, and
  perform a resource existence determination, only if the second overhead map out-of-range determination determines that the position in the virtual three-dimensional space is not out of the overhead map, of whether or not the piece of the image data corresponding to the position in the virtual three-dimensional space is included in the resource data.

17. An overhead map image data resource generation apparatus for generating an image data resource for displaying a map corresponding to an overhead view of a virtual three-dimensional space, the overhead map resource generation apparatus having one or more computer processor configured to perform operations comprising:
    acquiring separate images of each of a plurality of sub-regions of a predetermined region in the virtual three-dimensional space by obtaining an image of each sub-region from a viewpoint of an overhead virtual camera provided in the virtual three-dimensional space;
    determining whether information about a color included in an acquired image satisfies a predetermined condition; and
    generating overhead map image resource data by storing and accumulating, in a predetermined storage medium, only acquired overhead images which contain color information that does not satisfy the predetermined condition, and
    repeating said acquiring, determining and generating operations for each of said plurality of sub-regions until overhead image data corresponding to substantially all of said predetermined region in the virtual three-dimensional space is acquired.

18. An overhead map image data resource generation and display apparatus for displaying a two-dimensional map corresponding to an overhead view of a virtual three-dimensional space, the apparatus including one or more computer processor configured to provide functionality comprising:
    resource data accumulator and storage that generates map image resource data by accumulating image data obtained by executing a process of repeatedly acquiring an overhead image of each of a plurality of sub-regions of a particular region in the virtual three-dimensional space from a viewpoint of an overhead a virtual camera which is moved in the virtual three-dimensional space in a predetermined manner and storing only acquired image data whose color information does not satisfy a predetermined condition;
    image data selector that selects predetermined image data from stored map image resource data; and
    overhead map display generator that generates and displays an overhead map based on selected image data, and displays the overhead map on a display apparatus.

19. An overhead map image data resource generation and display apparatus for displaying a two-dimensional map corresponding to an overhead view of a virtual three-dimensional space, comprising:
    resource data accumulator and storage configured to generate map image resource data by accumulating image data obtained by executing a process of repeatedly acquiring an overhead image of each of a plurality of sub-regions of a particular region in the virtual three-dimensional space from a viewpoint of an overhead virtual camera which is moved in the virtual three-dimensional space in a predetermined manner, together with acquiring information indicating a position in the virtual three-dimensional space corresponding to each acquired image, and storing only acquired image data whose color information does not satisfy a predetermined condition;
    position obtainer that obtains a position, in the virtual three-dimensional space, corresponding to a predetermined display position in an overhead map of the virtual three-dimensional space;
    resource existence determiner that determines whether a piece of image data corresponding to the position in the virtual three-dimensional space obtained by the position obtainer was stored as map image resource data; and
    overhead map displayer that, if the resource existence determiner determines that a corresponding piece of the image data is included as stored map image resource data, obtains the corresponding piece of the image data from stored map image resource data and displays a corresponding image at the predetermined display position in the overhead map, and if said corresponding piece of the image data is determined as not included as stored map image resource data, displays a predetermined image at the predetermined display position in the overhead map.

20. A computer implemented method using one or more computer processor for generating an overhead viewpoint image data resource for displaying a two-dimensional map corresponding to an overhead view of a region in a virtual three-dimensional space and for displaying the overhead view map based on the image data resource, the method comprising:
    acquiring, using said one or more computer processor, a separate image of each of a plurality of sub-regions of a predetermined region in the virtual three-dimensional space by shooting the image from a viewpoint of an overhead virtual camera positioned in the virtual three-dimensional space;
    determining whether information included in an acquired image satisfies a predetermined condition;
    generating resource data by accumulating and only storing, in a predetermined storage medium, image data which does not satisfy the predetermined condition;
    repeating said acquiring, determining and generating operations until overhead images corresponding to all of a predetermined region in the virtual three-dimensional space are acquired;
    selecting predetermined image data from the resource data; and
    generating the overhead map based on the image data selected, and displaying the overhead map on a display apparatus.

21. The method of claim 20 wherein the predetermined condition is dependent upon a color in the acquired image.

* * * * *